US006419842B1

(12) United States Patent
Kupka

(10) Patent No.: US 6,419,842 B1
(45) Date of Patent: Jul. 16, 2002

(54) METHOD AND INSTALLATION FOR SEPARATING SOLIDS CONTENTS FROM A PULP

(75) Inventor: Dieter Kupka, Kirn (DE)

(73) Assignee: Bauko Baukooperation Ges. m.b.H., Salzburg (AT)

( * ) Notice: Subject to any disclaimer, the term of this patent is extended or adjusted under 35 U.S.C. 154(b) by 0 days.

(21) Appl. No.: 09/446,621

(22) PCT Filed: Apr. 23, 1999

(86) PCT No.: PCT/EP98/02787

§ 371 (c)(1),
(2), (4) Date: Dec. 23, 1999

(87) PCT Pub. No.: WO99/55441

PCT Pub. Date: Nov. 4, 1999

(30) Foreign Application Priority Data

Apr. 23, 1998 (EP) ........................................... 98107444

(51) Int. Cl.$^{7}$ .......................... B01D 37/00; B01D 33/37

(52) U.S. Cl. ....................... 210/780; 210/325; 210/329; 210/330; 210/331; 210/332

(58) Field of Search ............................. 210/323.1, 324, 210/325, 327, 328, 329, 330, 331, 332, 342, 488

(56) References Cited

U.S. PATENT DOCUMENTS

| | | | | | |
|---|---|---|---|---|---|
| 1,574,051 | A | * | 2/1926 | Morris | 210/325 |
| 2,538,575 | A | * | 1/1951 | Kracklauer | 210/324 |
| 3,970,564 | A | * | 7/1976 | Shamsutdinov et al. | 210/323.1 |
| 4,880,537 | A | * | 11/1989 | Drori | 210/323.1 |
| 5,069,790 | A | * | 12/1991 | Drori | 210/323.1 |
| 5,160,428 | A | * | 11/1992 | Kuri | 210/329 |
| 5,160,440 | A | | 11/1992 | Mérai | |
| 5,403,481 | A | | 4/1995 | Kupka | |

FOREIGN PATENT DOCUMENTS

| | | | | |
|---|---|---|---|---|
| DE | 3603317 | | 8/1987 | |
| EP | 0 226 659 A1 | | 12/1985 | |
| EP | 0 370 118 A1 | * | 5/1990 | B01D/29/50 |
| EP | 0 377 054 A1 | * | 7/1990 | B01D/29/11 |
| EP | 0 539 874 A1 | | 10/1992 | |

* cited by examiner

*Primary Examiner*—Robert J. Popovics
(74) *Attorney, Agent, or Firm*—McCormick, Paulding & Huber LLP

(57) ABSTRACT

For separating solids contents from a pulp, the pulp is concentrated in a filter device by intense movement up to a predetermined solid matter content. In the filter device, the dynamic pressure and Venturi effects are utilized to support the filtering process. During the discharge of the filtrate, pulp is supplied to keep the filter device in filled condition. The concentrated pulp is batch-wise transferred into a pressing chamber in which the discharged batch is mechanically pressed-out. The pressing cake generated thereby is mechanically comminuted.

9 Claims, 29 Drawing Sheets

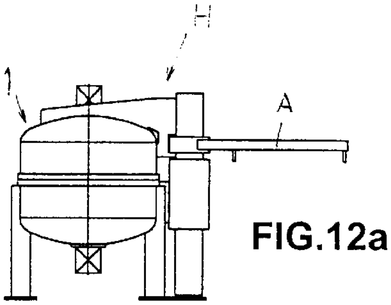
FIG.12a
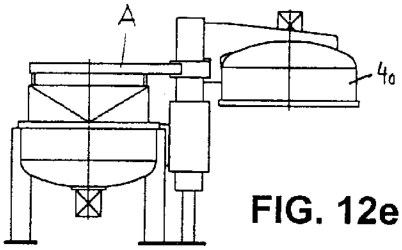
FIG. 12e
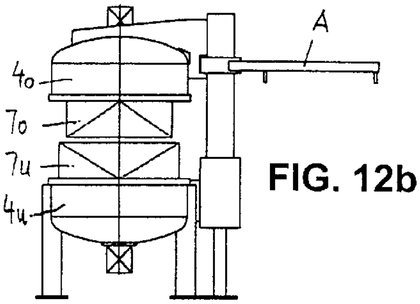
FIG. 12b
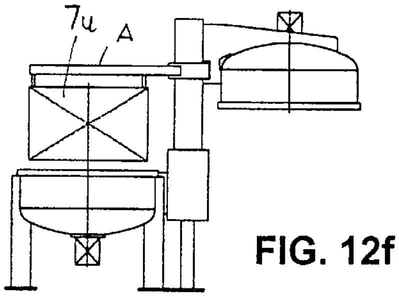
FIG. 12f
FIG. 12c
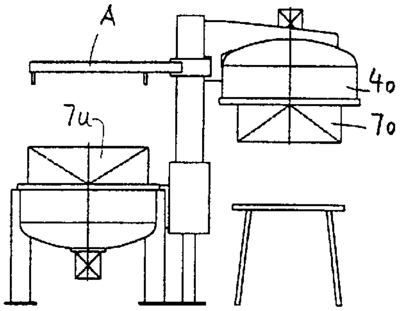
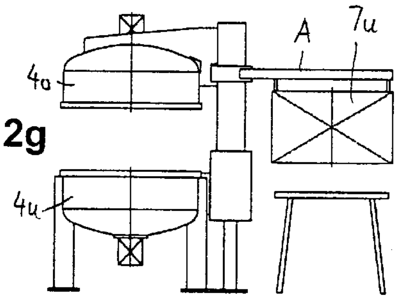
FIG. 12g
FIG. 12d
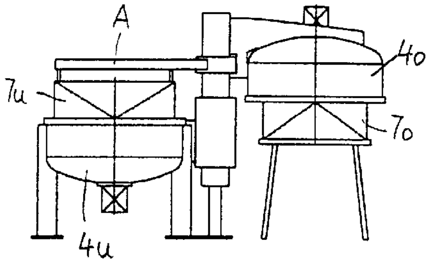
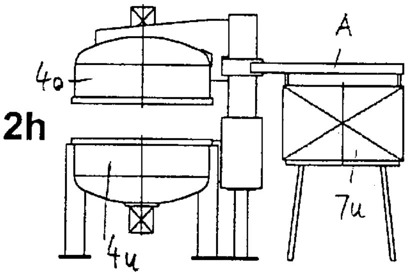
FIG. 12h

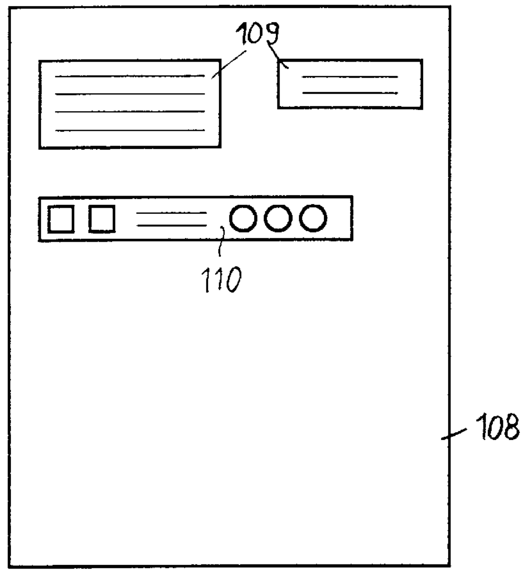
FIG. 32
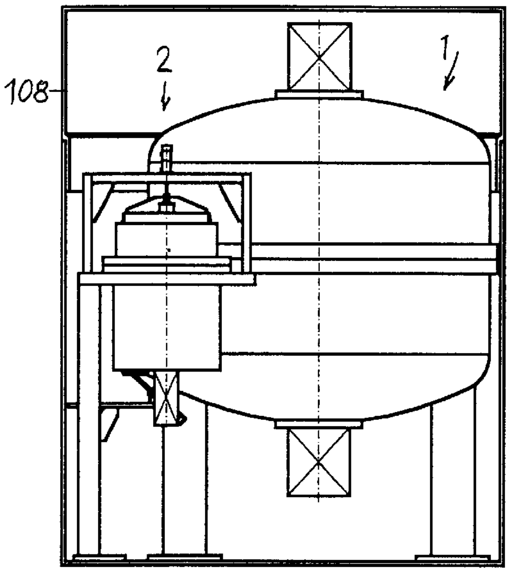
FIG. 33
FIG. 34
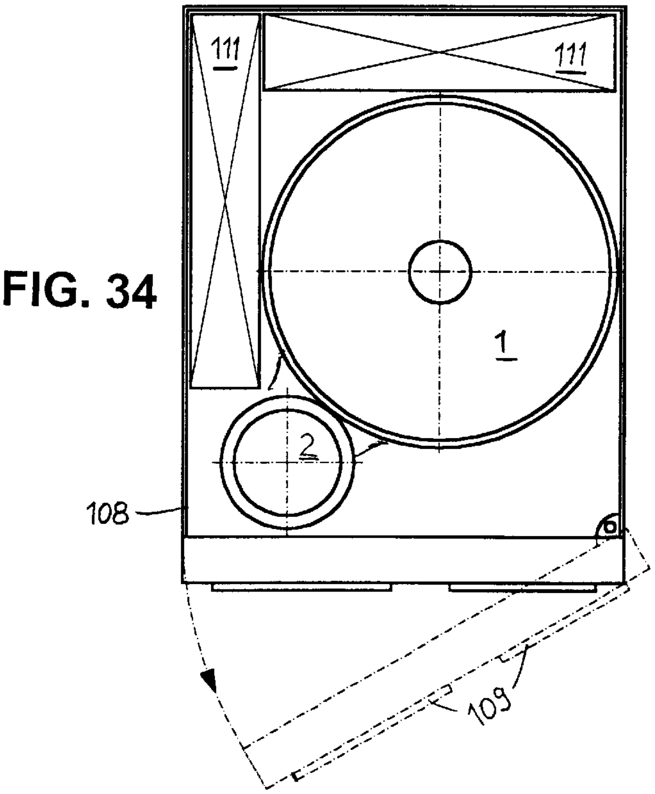

METHOD AND INSTALLATION FOR SEPARATING SOLIDS CONTENTS FROM A PULP

BACKGROUND OF THE INVENTION

The most common method of separating solids contents from a pulp is the filtering of the pulp by means of more or less fine pored filter media. A main disadvantage of these methods is that the pores of the filter media relatively quickly peg by solid matter particles from the pulp so that a severe hydrostatic pressure must be exerted onto the pulp in order to pass liquid through the filter medium. This hydrostatic pressure on the one hand leads to the fact that the particles are pressed even more into the pores of the filter medium thus causing the filter efficiency to deteriorate even further.

These disadvantageous effects can be reduced in that the filtering process is performed in many stages using progressively reduced pore sizes of the filter media. This, however, requires great expenditure.

A different help is the so-called cross-flow filtering in which the pulp is kept in a movement extending transversely to the surface of the filter medium to prevent the deposition of solid matter particles on the surface of the filter medium. Filter devices operating in this manner are for instance known from EP 0 178 389 A1. Also in these filter devices the formation of a filter cake on the filter media is basically unavoidable, thus influencing the filtering efficiency.

A further filter device operating by cross-flow is known from EP 0 226 659 A. In this filter device, a rotor rotating in the pulp chamber and which keeps the pulp in motion during the filtering process, is displaceable upon termination of the filtering process against the unmoved filter medium so that by the aid of this rotor the filter cake unavoidably growing on the filter medium can be mechanically pressed out before being removed from the filter device. The operation of this device therefore consciously provides the separation of the solid matter particles on the filter membranes and requires cyclic interruptions which are necessary to press out the filter cakes that were produced and to remove them from the filter device. The generation of filter cakes during the filtering process moreover requires significant hydrostatic pressure in order to achieve satisfactory filter efficiencies.

Thus, the object of the invention is to provide a method and an apparatus by means of which a separation of solids contents from a pulp is possible during continuous or more or less continuous operation and wherein an increased efficiency can be obtained without a high hydrostatic pressure having to be exerted onto the pulp.

SUMMARY OF THE INVENTION

This object is solved with respect to the method by the features cited in claim 1. Advantageous embodiments of the invention are subject matter of the dependent claims.

According to the invention the pulp is only concentrated in the filter device. This enables the pulp to be kept in motion during the entire treatment process in the filter device used for this purpose so that due to the pulp flow running transversely to the surfaces of the filter media a deposition of solid matter particles on the surfaces of the filter media is fully or almost fully prevented. Thus, the differential pressure at the filter media is kept small. Preferably the speed of the cross flow of the pulp is set especially high. In a preferred embodiment of the invention a pump flow is generated in the pulp which does not only lead to a high cross flow speed but also generates a high dynamic pressure in the pulp at the filter membranes so that the differential pressure of the membranes is overcome without requiring the pulp to be exposed to a hydrostatic pressure.

When the pulp chamber is set under hydrostatic pressure, which is also possible, this pressure can be set low compared to the prior art. Then, it only serves the purpose of ensuring a sufficient filtrate flow through the filter media, since it does not have to overcome a filter obstruction.

If during the filter operation a predetermined solid matter concentration of the pulp in the filter device is achieved, this concentrated pulp is mechanically pressed out. For this purpose it is first of all taken off the filtering process.

The concentrated pulp may be conditioned by an additive to progress the pressing process, e.g. by the aid of milk of lime in order to generate coagulation.

The subsequent mechanical pressing process is not a filtering process but shall only serve for the rough drainage of the concentrated pulp. Accordingly the discharge from the pressing process is not free from particles and is therefore returned into the filtering process.

The pressing cake generated by the mechanic pressing process is then mechanically comminuted and the agglomerates produced thereby can, if desired, be kept in a whirling condition so that the remaining moisture is withdrawn from them. This drying process can be accelerated by the influence of vacuum pressure or by heat. An ultraviolet irradiation can also be acted upon the whirling particles in order to kill possibly existing germs.

To carrying out the method, a plurality of pressing devices of smaller capacity can be assigned to a filter device of a greater capacity so that the filter device can be more or less continuously supplied by fresh pulp and can be freed from the particle concentrate, wherein the pressing devices, preferably pressing dryers are used in a chronologically staggered manner.

The solid matter particle concentration degree reached in the filter device can for instance be determined by optical means detecting the light permeability of the pulp, or by measuring the driving power which is required to keep the pulp in the filter device in motion.

The operation is especially economical when during the drying process the heating of the particles in the whirl chamber is performed by process heat, for example the heat that is produced during the filtering process due to inner friction in the pulp and which is transferred to the filtrate. Then the filtrate can be used for heating the particles in a whirl chamber in a manner that the walls of the whirl chamber are heated by the filtrate. This filtrate can be conditioned before or after utilizing its heat, for instance its pH value may be set in order to be gentle for the apparatus and the environment.

BRIEF DESCRIPTION OF THE DRAWINGS

The invention will now be described with reference to the drawings by means of an embodiment of an installation for separating solids contents from a pulp and details of the installation, wherein:

FIGS. 12*a* to 12*h* show a schematic sequence which shows the maintenance possibilities of the filter plug groups in the filter device of FIGS. 10 and 11;

FIG. 32 shows a side elevation view of a housing in which an installation according to the invention is accommodated;

FIG. 33 shows a view into the housing according to FIG. 32 from the side, and FIG. 34 shows a view into the housing of FIG. 33 from the top;

DESCRIPTION OF THE PREFERRED EMBODIMENTS

Figure 1:
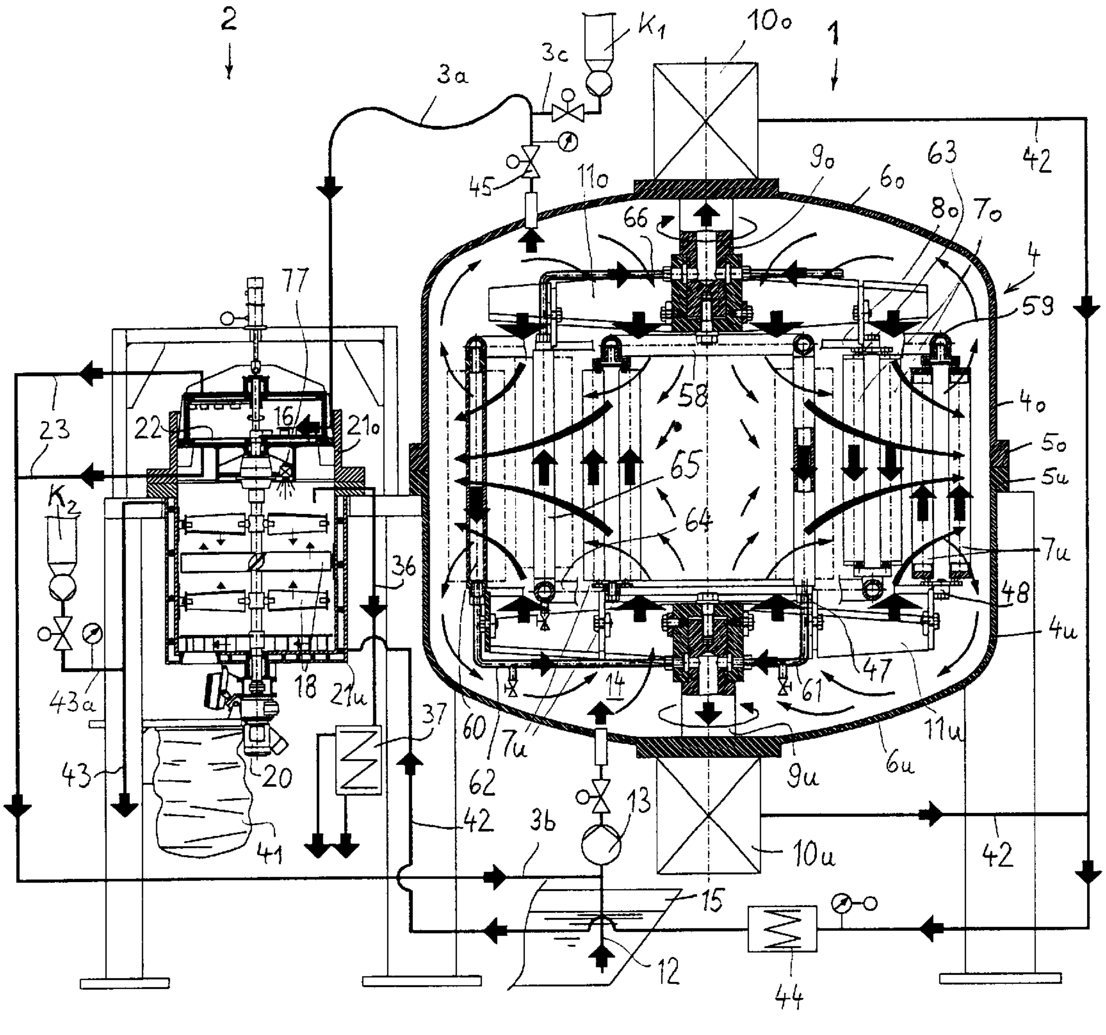
FIG. 1 is a cross-sectional view of an installation according to the invention for carrying out the method.

The installation for separating solids contents from a pulp according to FIG. 1 basically consists of a filter device designated by 1 and a pressing dryer designated by 2, which are connected to each other through a pulp transfer line 3*a* and a waste water return line 3*b*.

Figure 9:
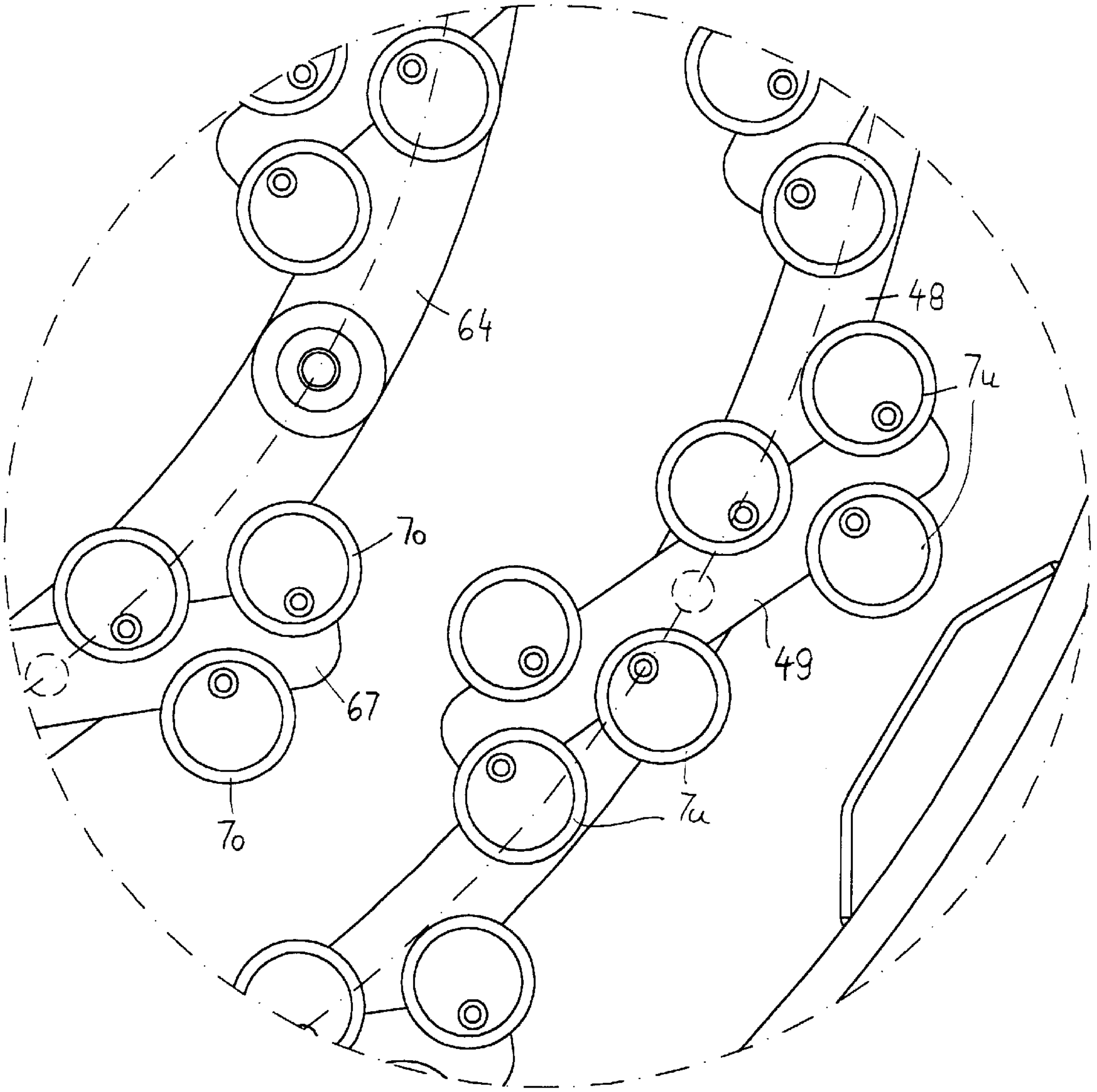
FIG. 9 is the section of a schematic view of an alternative embodiment of the filter plug support.

The filter device 1 consists according to FIGS. 1 and 9 of a vessel 4 composed of an upper shell 4*o* and a lower shell 4*u* which are detachably connected to each other approximately in the center of the vessel 4 by means of upper and lower flanges 5*o* and 5*u*, respectively formed at the shells. The end walls 6*o* and 6*u* of the vessel 4 are bulged in a lens-shaped manner. The diameter of the vessel 4 is approximately 1.3 times the height of the jacket section of the shells 4*o* and 4*u*.

Two filter element groups are arranged in the vessel 4. The one filter element group is assigned to the upper shell 4*o* and contains filter elements which in this case are formed as filter plugs 7*o* which are attached on a circle at an upper carrying structure 8*o*. The upper carrying structure 8*o* is attached at an upper hollow shaft 9*o* which penetrates the upper end wall 6*o* of the shell 4*o* and which can be rotated by an upper motor 10*o*. Moreover, the wings 11*o* of an upper turbine are attached on the upper hollow shaft 9*o* adjacent to the upper end wall 6*o*, said wings belonging to the upper carrying structure 8*o*.

Comparable thereto, a lower filter element group is assigned to the lower shell 4*u*, said lower filter element group consisting of filter elements which in the embodiment shown are also filter plugs 7*u*, which are arranged on two concentric circles of different diameters and which are held by a lower carrying structure 8*u* which is attached at a lower hollow shaft 9*u*. The lower hollow shaft 9*u* penetrates the lower end wall 6*u* of the housing shell 4*u* and is driven by a lower motor 10*u* opposite to the direction of rotation of the upper hollow shaft 9*o*. Furthermore, the wings 11*u* of a lower turbine are attached at the lower hollow shaft 9*u* close to the lower end wall 6*u*, said wings 11*u* belonging to the lower carrying structure 8*u*.

The circle of the filter plugs 7*o* of the upper filter element group is arranged between the two circles of the filter plugs 7*u* of the lower filer element group.

The pulp chamber 14 in the vessel in which the filter element groups and their carrying devices are located are chargeable by a pulp from a reservoir container 15 via a supply line 12 and a pump 13. An intensive flow is caused in the pulp in the pulp chamber by an opposed movement of the filter element groups 7*o* and 7*u* caused by the motors 10*o* and 10*u*, said intensive flow being indicated in FIG. 1 by arcuate arrows and causing in the center of the vessel a pressure that is increased compared to the peripheral portion. This flow passes the filter elements 7*o* and 7*u* radially outwardly. Caused by the rotation of the filter elements around the axis of the vessel 4, a further movement component between the filter elements and the pulp results, which passes the surface of the filter elements transversely to the surface of the filter elements. Details will be explained later.

The pulp transfer line 3 leading out of the vessel 4 leads to the pressing dryer 2, i.e. into a pressing chamber 16 at the head of the pressing dryer 2. A whirl chamber 17 is located below the pressing chamber 16, with a rotor provided with a plurality of blades 18 rotating in said whirl chamber, said rotor being rotated by a motor flange-mounted to the shaft 19 outside the whirl chamber 17. A stub line 3*c* opens into the pulp transfer line 3*a*, through which said stub line a condition medium being supplied via a valve, said conditioning medium being characterized by K1 and improving the pressing force of the concentrated pulp. The medium may for example be milk of lime which makes the pulp components coagulate.

The pressing dryer 2 is formed by a vessel 21, consisting of an upper part 21*o* and a lower part 21*u* which are connected to each other at flanges. The pressing chamber 16 is separated from the whirl chamber 17 by a transverse wall 22 which has a smaller outer diameter than the inner diameter of the upper part 21*o*. Details will be explained later. Two drainage lines 23 lead from the pressing chamber 16 to the outside, said drainage lines opening into the return line 3*b*. The latter is connected to the pulp supply line 12 upstream the pump 13.

Figure 2A:
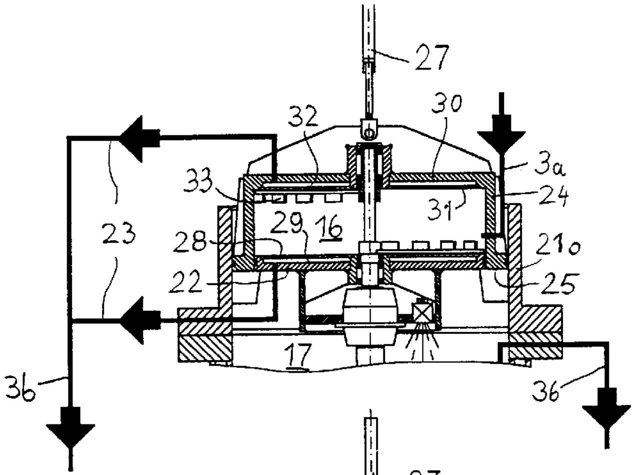
FIGS. 2*a* to 2*c* are different conditions of the operation of the press dryer in the installation of FIG. 1.
Figure 2B:
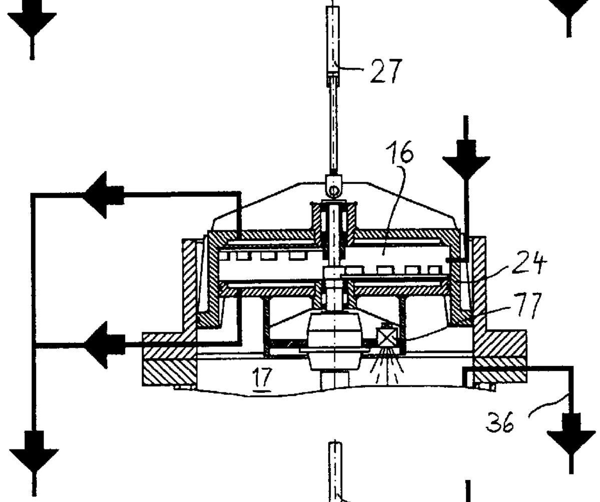
Figure 2C:
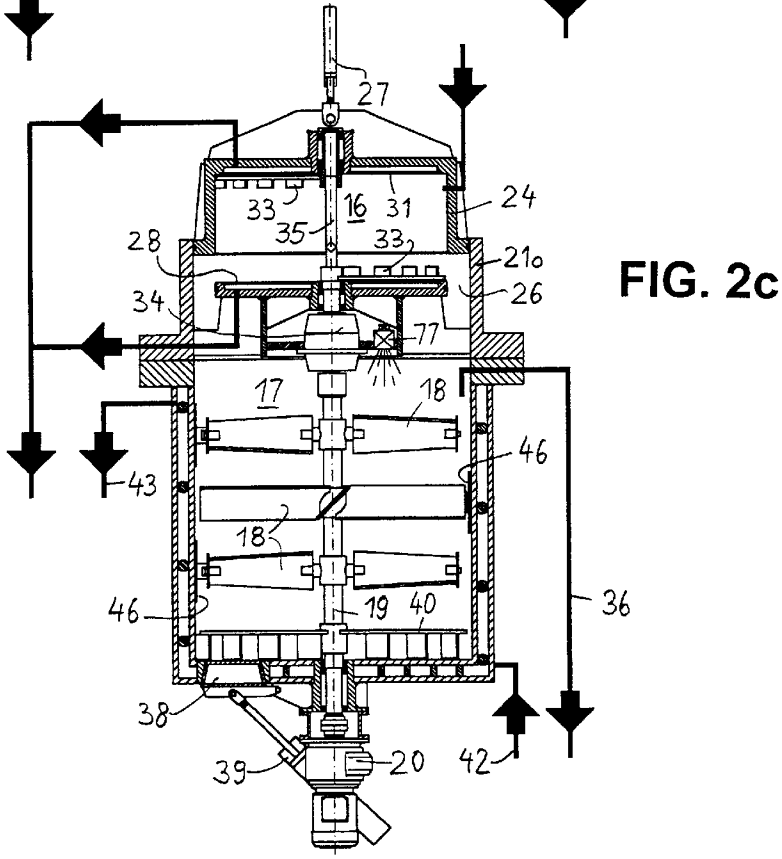

As shown in FIG. 2, the pressing chamber 16 is arranged above the whirl chamber 17 and is separated therefrom by the transverse wall 22. Moreover, the pressing chamber 16 is defined towards the top by a bell 24 which has a lower edge 24 which closes in the position shown in FIG. 2*a* an annular gap 26 (see FIG. 2*c*) between the circumferential edge of the transverse wall 22 and the inner wall of the upper part 21*o* of the vessel 21.

The bell 24 is adjustable in the axial direction by means of a hydraulic cylinder 27 and said bell therefore acts as a pressing plunger. In FIG. 2*a* the bell 24 takes a position in which the space of the pressing chamber formed by this bell together with the transverse wall 22 is at a maximum and the pressing chamber 16 is locked. This is the filling position in which the pressing chamber 16 can be filled via the transfer line 3*a* with a concentrated pulp from the filter device 1.

According to FIG. 2*a*, the transverse wall 22 carries on its upper side a sieve 28 below which a drainage chamber 29 is located which is drained through one of the outlet lines 23 to the outside. A further sieve 31 is located in parallel to the bottom 30 of the bell 24, said further sieve defining a drainage chamber 32 together with the bell bottom 30, said drainage chamber being drained through the other outlet line 23 in the direction towards the return line 4.

When the pressing chamber 16 is filled with the concentrated pulp, the bell 24 can be displaced downwardly by means of the hydraulic cylinder 27. The interior of the pressing chamber 26 is therefore made smaller and the pulp located therein is mechanically pressed out. The pressed-out liquid is discharged through the sieves 28 and 31 and the outlet lines 23 to the return line 3*b*. It is clear that this liquid still contains solids contents, since the sieves 28 and 31 do not have a significant filtering function. The pressed-out liquid is therefore returned by means of the return line 3*b* and through the pulp supply line 12 to the filter device 1.

After the pressing process, a pressing cake (not shown) is formed in the pressing chamber 16 on the sieves 28 and 31. This pressing cake must be removed from the pressing chamber 16. For this purpose, the bell 24 is lifted by means of the hydraulic cylinder 27 according to FIG. 2*c* such that the annular gap 26 between the circumference of the transverse wall 22 and the inner wall of the upper vessel part 21*o* opens.

In this connection it must be mentioned that on the side of the sieves 28 and 31 where the pressing cake was formed, one scraper device 33 each is located, which can be driven by means of a motor 34 and a shaft 35 arranged below the transverse wall 22, and which clear away and comminute the pressing cake arranged on the sieves 28 and 31 and transport it into the annular gap 26.

According to FIG. 1 and FIG. 2*c*, a plurality of blades 18 are arranged in the whirl chamber 17, said blades being set into fast rotation by a motor 20 by means of the shaft 19. The pressing cake parts falling down from the pressing chamber 16 hit these blades 18. They are further comminuted and held flying by the blades 18.

The whirl chamber 17 is connected to an outlet line 36 which leads to a moisture divider 37 and to a vacuum source (not shown). On the bottom, the lower portion 21*u* of the vessel 21 is provided with an outlet flap 38 which can be opened by means of a hydraulic drive. FIG. 1 shows the open position, FIG. 2*c* shows the closed position.

Some of the blades 18 are provided with wall scrapers 46 which contact the inner wall of the lower portion 21*u* of the vessel 21, wherein the areas of coverage of these wall scrapers 46 overlap each other. The rotation of the blades 18 leads to the prevention of solids contents caking at the inner wall of the lower vessel portion 21*u*. A clearer 40 is attached on the shaft 19 adjacent to the bottom of the lower vessel portion 21*u*, said clearer 40 clearing away the dried solid matter particles into the outlet opened by the flap 38 when emptying the whirl chamber 17. A collecting bag (see FIG. 1) is arranged below this outlet.

As may be seen in FIGS. 1 and 2*c*, the lower vessel portion 21*u* has a double wall, and according to FIG. 1 the space of the double wall is connected to supply and discharge lines 42 and 43. The supply line 42 supplies the heated filtrate from the filter device 1, which can possibly be further heated by a post-heater 44 in case the temperature increase of the filtrate caused by the filtering process is not sufficient for heating the lower vessel portion 21*u*.

A conditioner medium may be supplied in the discharge line via a stub line and a valve, said conditioner medium being symbolized in this case by K2 and which for instance serves for setting the pH value of the filtrate before the filtrate is discharged to the outside.

During operation the filter device 1 is supplied with pulp via the pump 13 from the reservoir 15. The pump 13 fully fills the vessel 4 with pulp and keeps the pulp at a predetermined pressure. It permanently continues filling as much pulp as escapes from the pulp chamber 14 by the flowing of the filtrate through the filter elements 7*o* and 7*u*. When a predetermined solids contents concentration is reached in the pulp chamber 14, which can be determined for instance by optical means (not shown) or by measuring the energy consumption of the drive motors 10*o* and 10*u*, a valve 45 arranged in the pulp transfer line 3*a* is opened and the pressing chamber 16 is filled in the position shown in FIG. 2*a* by the concentrated pulp. The drainage of the concentrated pulp from the pulp chamber 14 is ensured by the permanent supply of new pulp by means of the pump 13. In the pressing dryer 2 the above-mentioned processing of the concentrated pulp is then performed.

The processing capacity of the pressing dryer is in a purposeful manner adapted to the filter device so that idling times do not occur at any of the units participating in the process. As an alternative it is, however, also possible to assign to a filter device of a greater capacity a plurality of smaller pressing dryers, or vice versa to assign to a pressing dryer with greater capacity a plurality of smaller filter devices.

The essential factor for achieving the goal aimed at by the invention is that a strong concentration of the solid matter does actually not take place in the pressing dryer that the risk of an obstruction of the pores of the filter elements is generated since the pulp can no longer be kept in sufficient motion, and that on the other hand the solid matter concentration of the pulp achieved in the filter device is sufficiently high that an economic operation in the pressing dryer is possible. In other words a mechanical pressing of the pulp introduced into the pressing dryer becomes wothwhile and delivers acceptable results.

An important aspect of the invention is furthermore, that an actual filter process does not take place in the pressing dryer. Thus, the various difficulties caused by ordinary filtering processes do not exist therefrom the start. Instead, an impure liquid containing solid matter residue is mechanically pressed out of the concentrated pulp which is returned into the filtering process. At this point, it must be emphasized that the features of the pressing dryer have an independent inventive meaning an particularity independent of the features of the filter device, and the pressing dryer can also be operated with different filter devices than shown in the present case. The same applies vice versa for the filter device.

Further details of the components participating in the method according to the invention and their influence on the method as well as advantages will now be explained.

Figure 3:
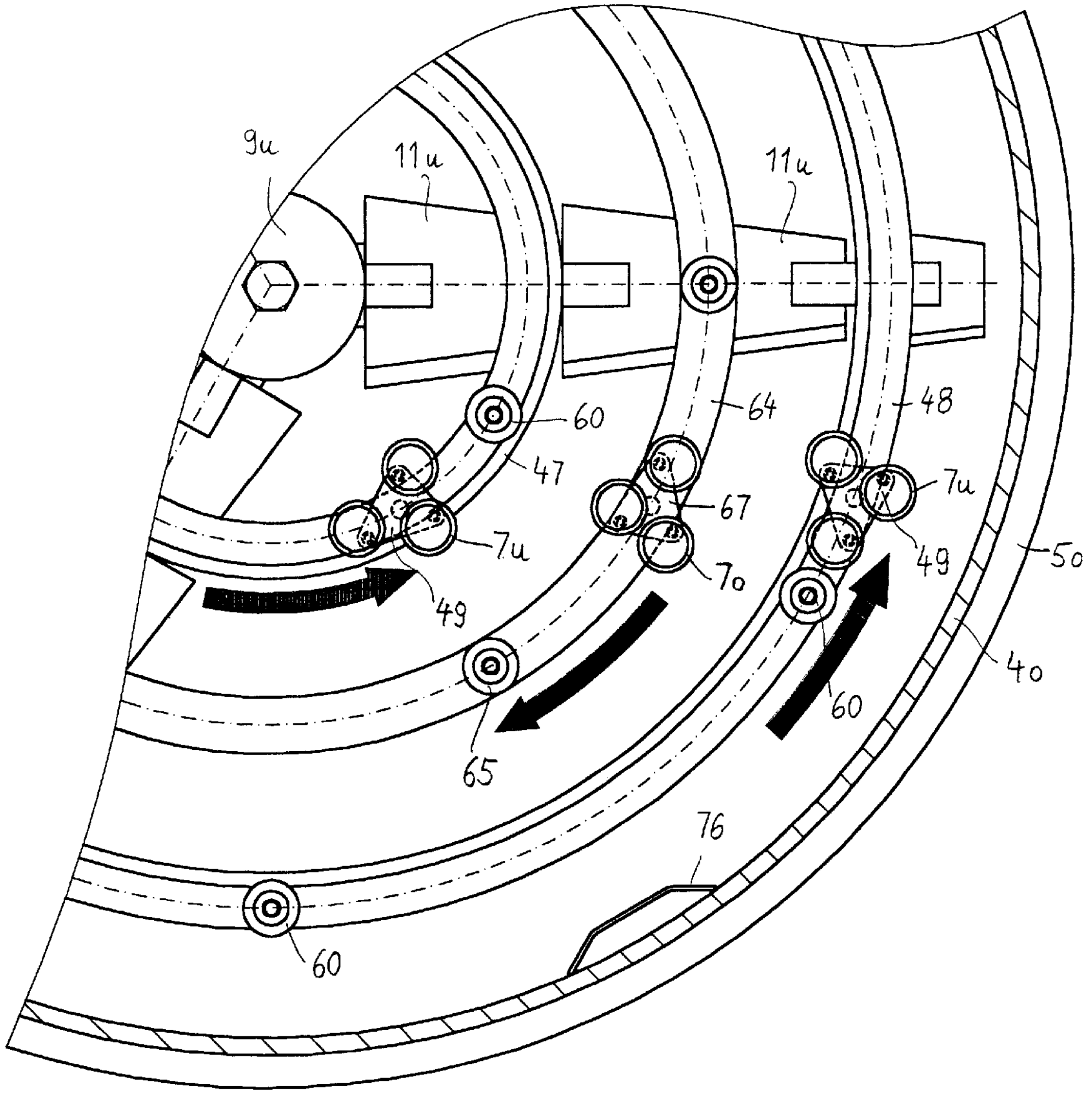
FIG. 3 is a selective view for explaining the arrangement of filter plugs.

First of all, the filter device is examined. FIG. 3 shows a detail of a cross-sectional view of the filter device 1 in a radial cuting plane arranged above the flange 5*o*. Three filter element subgroups only are shown, but it is self-evident that a great variety of such filter element subgroups is attached at regular distribution at the carrying structures shown.

The lower hollow shaft 9*u* can be seen with a carrying structure attached thereto to which the radially extending blades 11*u* of the lower turbine belong. Two annular carriers 47 and 48 of different diameters concentric with respect to the axis of the hollow shafts 9*u* are attached on the turbine blades 11*u*. These carriers may in particular be tubes. Foot consoles 49 are attached on these carriers 47, 48, also belonging to the lower carrying structure 8*u*, at regular circumferential distances, said foot consoles being triangles in the example shown. For reasons of clarity only one foot console from a plurality of foot consoles is shown in each carrier 47, 48.

Figure 6:
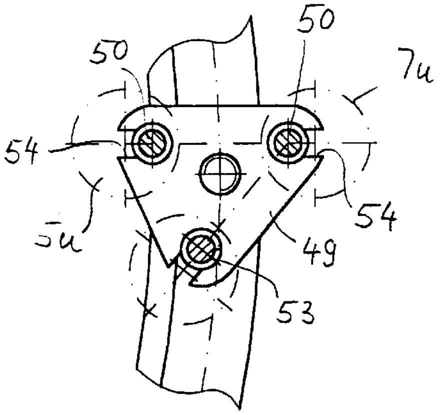
FIG. 6 is a detail to explain the support of the foot sections of the filter plugs.

According to FIGS. 3 and 6, three filter plugs 7*u* are attached at each foot console 49 by their foot sections. The filter plugs 7*u* assigned to a foot console 49 form a filter plug subgroup.

Figure 4:
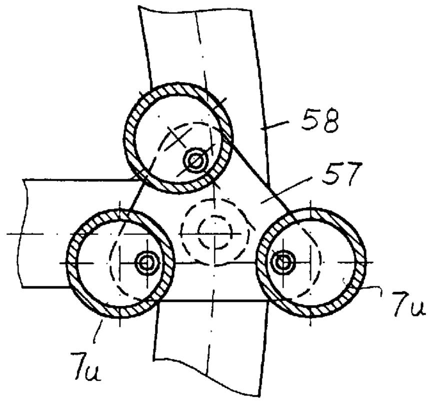
FIG. 4 shows a detail to explain the support of the heads of filter plugs.

The filter plugs 7*u* in the example shown according to FIG. 4 have mounting studs 50 with a constriction 51, said mounting studs being arranged eccentrially with respect to the axis of the plug, with an enlarged foot 52 being connected to the free end of the mounting stud. Each foot 52 is seated in a bore 53 of the console 49, which according to FIG. 6 has a slot 54 open towards the edge of the console, the width thereof corresponding to the diameter of the constriction 51. By turning the filter plugs 7*u* within the bores 53 it is possible to change the mutual surface distance of adjoining filter plugs 7*u*. Alternative embodiments of filter plugs and the installation thereof at the foot consoles will be explained later. The slot 54 facilitates the assembly and disassembly of the filter plug.

Figure 5:
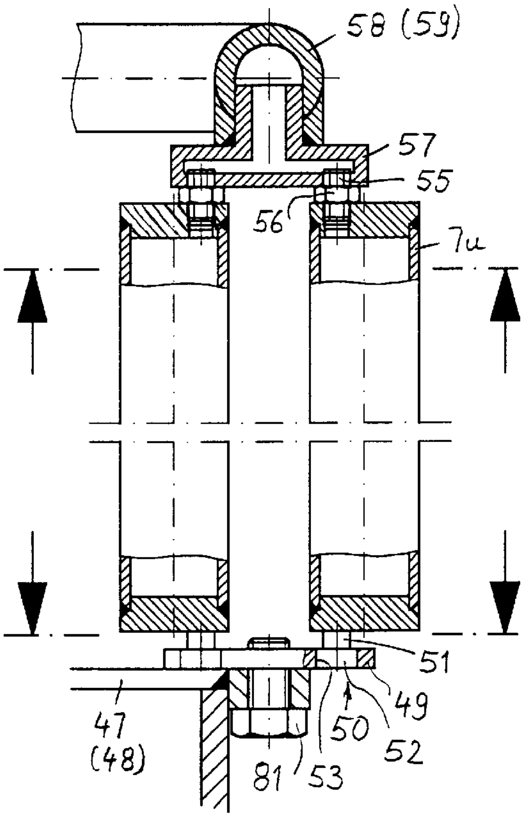
FIG. 5 is a sectional view to explain the support of the filter plugs.

According to FIG. 5, the filter plugs 7*u* are provided with a tubular screw stud 55 at the other end, i.e. at the upper end, said screw stud being on the same axis as the foot-sided mounting stud 50. The screw stud 55 has a hexagon socket 56 and is screwed into one of three threads in a triangular hollow head console 57.

The head console 57 is attached to an annular tube 58, the diameter of which corresponding to that of the carrier at which the foot console of the respective filter plug subgroup is attached. Thus, two annular tubes 58, 59 of different diameter exist. The annular tubes 58 and 59, respectively are connected to the associated carriers 47 and 48, respectively, by a plurality of supports 60 extending substantially in parallel to the axis of the vessel 4. At least one of these supports 60 is hollow and the one end thereof is connected to the interior of the associated annular tube 58 and 59, respectively. At the other end the interior of the hollow support 60 is connected via a connection tube 60 and 62, respectively (see FIGS. 1 and 10) to the hollow space of the lower hollow shaft 9*u*. These connecting tubes 61 and 62 may be integrated into the lower carrying structure 8*u*.

In this manner a fluid communication is provided which leads from the interiors of the filter plugs 7*u* through the screw studs 55, the hollow head consoles 57, the annular tubes 58 and 59, respectively, the hollow supports 60 and the connection lines 61 and 62, respectively into the hollow space of the lower hollow shafts 9*u* and from there into the supply line 42 to the hollow wall space of the pressing dryer 2.

The lower hollow shaft 9*u* is supported in a sealed manner in the lower front wall 6*u* of the vessel 4.

A corresponding structure is assigned to the upper shell 6*o* of the vessel 4. The upper hollow shaft 9*o* thereof carries the upper carrying structure 80 with an associated annular carrier 63, which has a diameter which is between the diameters of the lower carriers 47 and 48. An annular tube 64 is arranged in parallel thereto, which by means of supports 65 extending parallel to the axis is connected to the carrier 63, with at least one of them being hollow.

In a manner fully comparable to the filter plugs 7*u*, however turned upside down with respect thereto, the filter plugs 7*o* are mounted by the aid of head and foot consoles between the carrier 63 and the annular tube 64. The head console can be viewed in FIG. 3 and is designated there by 67. The at least one hollow support 65 is connected through a connection line 66, which may be integrated into the upper carrying structure 8*o*, to the hollow space of the upper hollow shaft 9*o*, said hollow space being drained by the supply line 42 towards the hollow wall space of the pressing dryer 2. All installation details of the filter plugs 7*o* are completely comparable to those of the filter plugs 7*u* so that a repetition of the description is not necessary.

It can be seen that the crown of the filter plugs 7*o* attached at the upper carrying structure 8*o* is arranged between and free of contact with the two crowns of the other filter plugs 7*u* attached at the lower carrying structure 8*u*.

The effect caused by the arrangement of the filter elements 7*o*, 7*u* and how this arrangement can be influenced will be explained with reference to FIG. 7.

Figure 7:
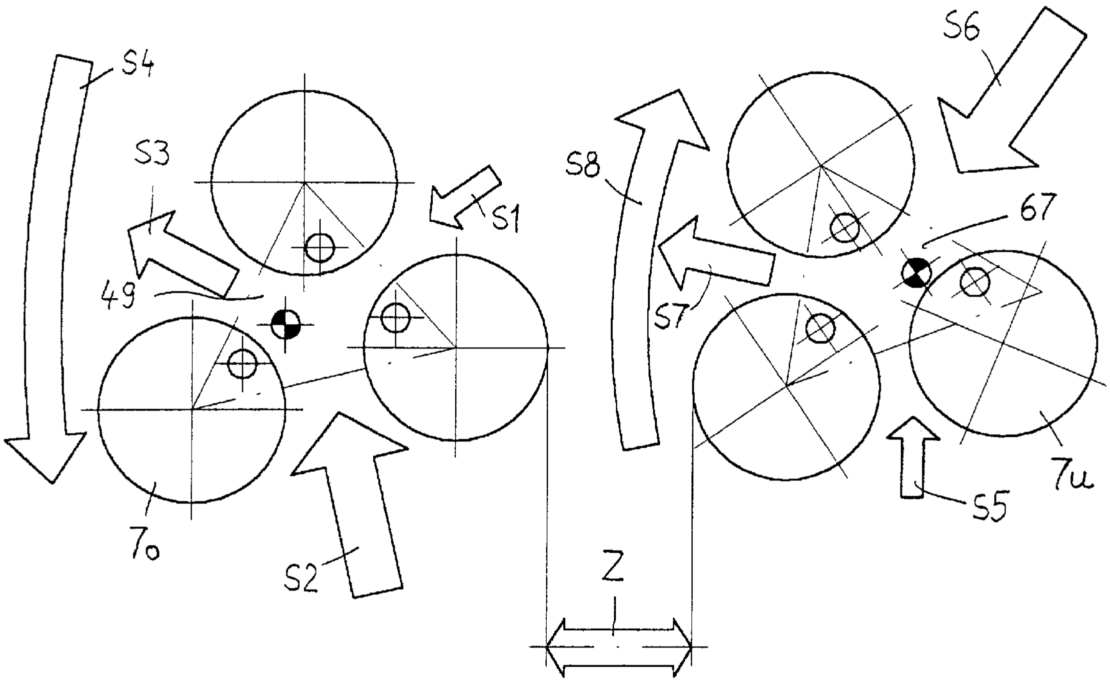
FIG. 7 is a schematic cross-sectional view of filter element subgroups to explain the flow courses.

Caused by the rotation of the filter element subgroup from the filter plugs 7*o* in the clock-wise direction, a flow of the pulp hits these filter plugs 7*o*, which is referenced in FIG. 7 by S1. It produces a dynamic pressure at the surfaces of the filter plugs 7*o* flown against, said dynamic pressure supporting the filtering process. This flow S1 is accelerated in the gap between the two filter plugs 7*o* flown against and hits at increased speed the third filter plug 7*o* of this sub-group arranged behind the gap so that the dynamic pressure produced at this filter plug 7*o* is correspondingly higher.

Caused by the flow created in the pulp by the turbines 11*o* and 11*u* and directed from the center of the vessel 4 radially outwardly, the filter element subgroup is also flow against at the radial inner side which is indicated by arrow S2. This flow is not so strong as the flow S1, which is why the gap between the filter plugs flow against by the flow is broader than the gap for the flow S1. The pulp flowing between the filter plugs 7*o* of the subgroup leaves—in a partially drained manner—the subgroup radially outwardly which is indicated by arrow S3.

Caused by the rotation of the filter element subgroup in clockwise direction, this filter element subgroup is also flown against by the pulp at its radial outer side. This is indicated in FIG. 7 by arrow S4. This flow is of pure tangential nature at filter plugs 7*o* exposed to this flow so that a deposition of solid matter particles at the filter plugs is also mostly prevented in this area.

On the other hand, the subgroup consisting of the filter plugs 7*u* rotates in anti-clockwise direction around the axis already mentioned (not shown). The flow of pulp against the direction of rotation takes place according to arrow S5 and from the center of the vessel due to the already mentioned effect of the turbines in the direction of arrow S6, where in turn the gap between the filter plugs 7*u* flown against is adjusted broader than the gap for the flow S5. The pulp flowing in between the filter plugs 7*u* leaves the area of this filter plug subgroup according to the flow S7 towards the radial outside into the gap defined between the filter element groups and designated in FIG. 7 by Z. There the subgroup from the filter plugs 7*u* is tangentially flown against by the flow S8.

At this point it must be emphasized that the flows defined are always resulting or relative flows since the filter elements are in motion and they hit a pulp moved by the turbines and the movement of rotation of the filter elements.

FIG. 7 illustrates very clearly that by the eccentric support of the filter elements these filter elements can be varied regarding their mutual distance by rotation on their supporting consoles so that optimizations in accordance with the pulp to be processed, the speed of rotation, the pressure etc. can be achieved.

Figure 8:
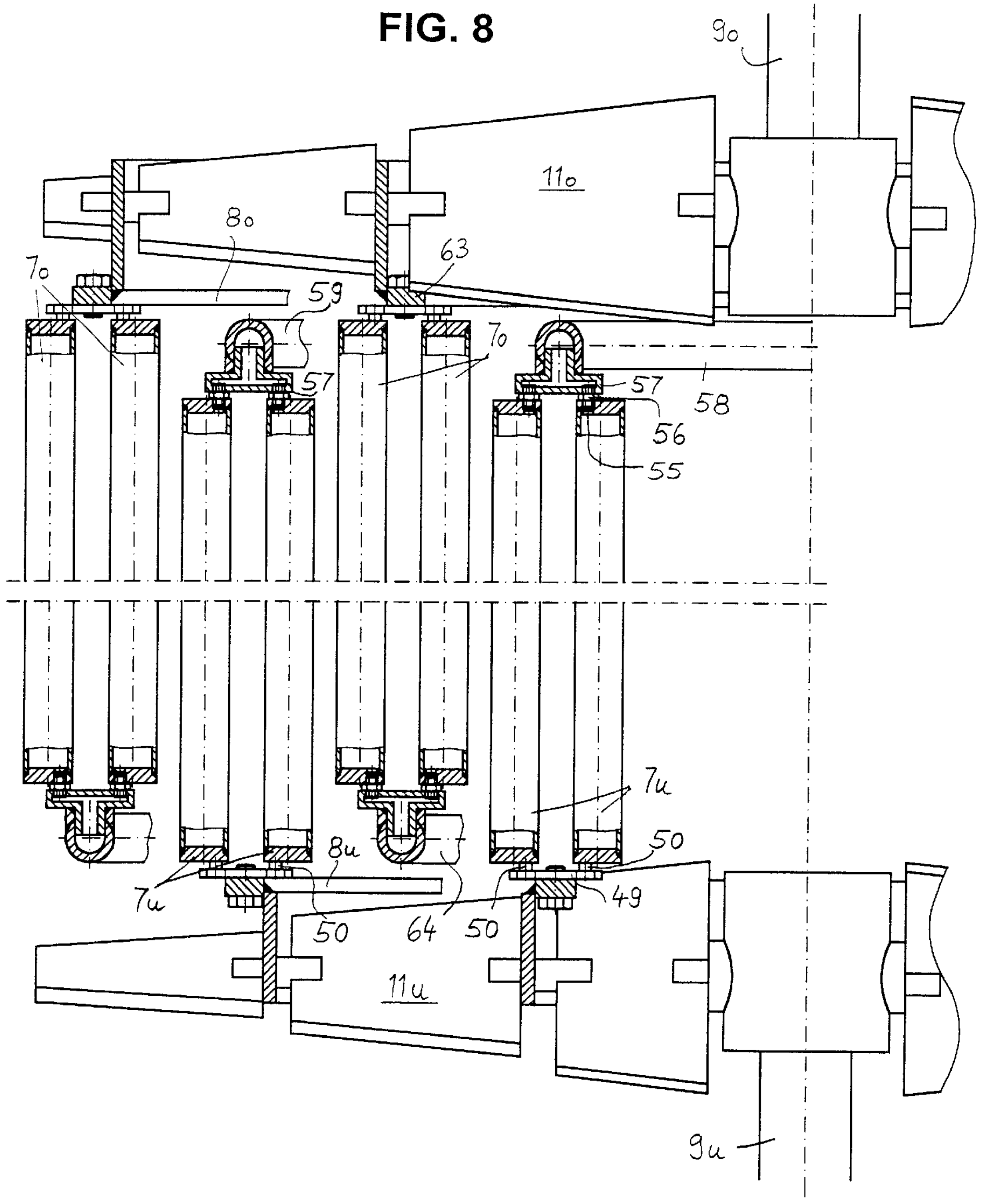
FIG. 8 is a selective view of filter plugs and their installation in the filter device.

At this point it must be emphasized and in consideration of FIG. 8 it must be explained that the arrangement described is not restricted to three crowns of filter plug subgroups arranged concentrically inside one another, but each carrying structure can possibly also comprise more than one or two of such crowns. As an example FIG. 8 shows an embodiment in which at the lower and at the upper carrying structure two crowns of filter plugs are arranged which are arranged in subgroups. Since the components shown in FIG. 8 are characterized by the formerly used reference numerals, a detailed description thereof is not necessary.

FIG. 9 shows that the shape of the consoles for the support of the filter plugs is not restricted to the triangular shape shown in FIGS. 3, 5 and 7. In the embodiment according to FIG. 9, the consoles are rather elongate slim and each hold six filter plugs in a subgroup which is pivotally supported at the consoles in order to be able to adjust the mutual surface distances.

Figure 10:
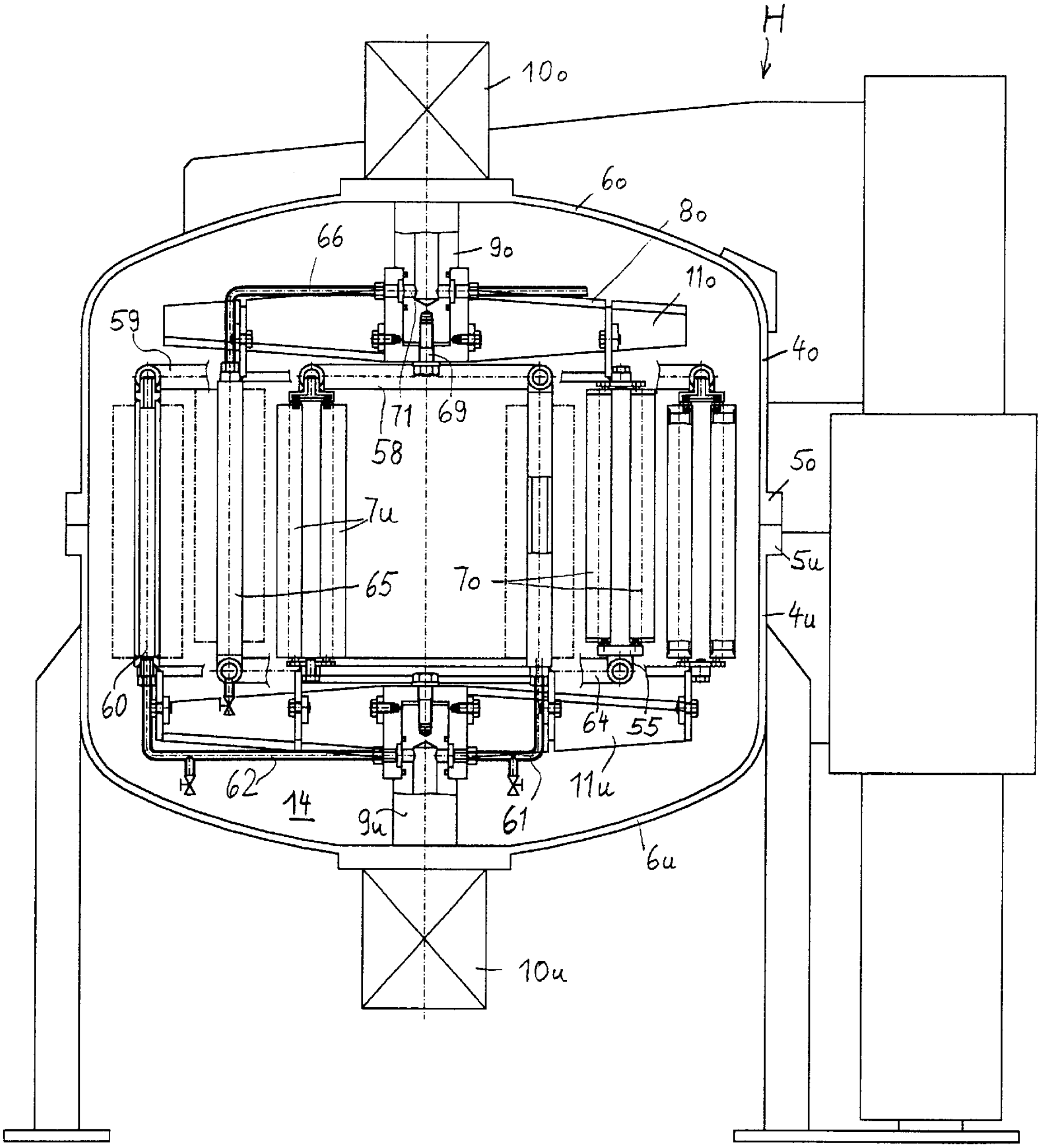
FIG. 10 is a partially cut view of a filter device according to the invention in closed condition.
Figure 11:
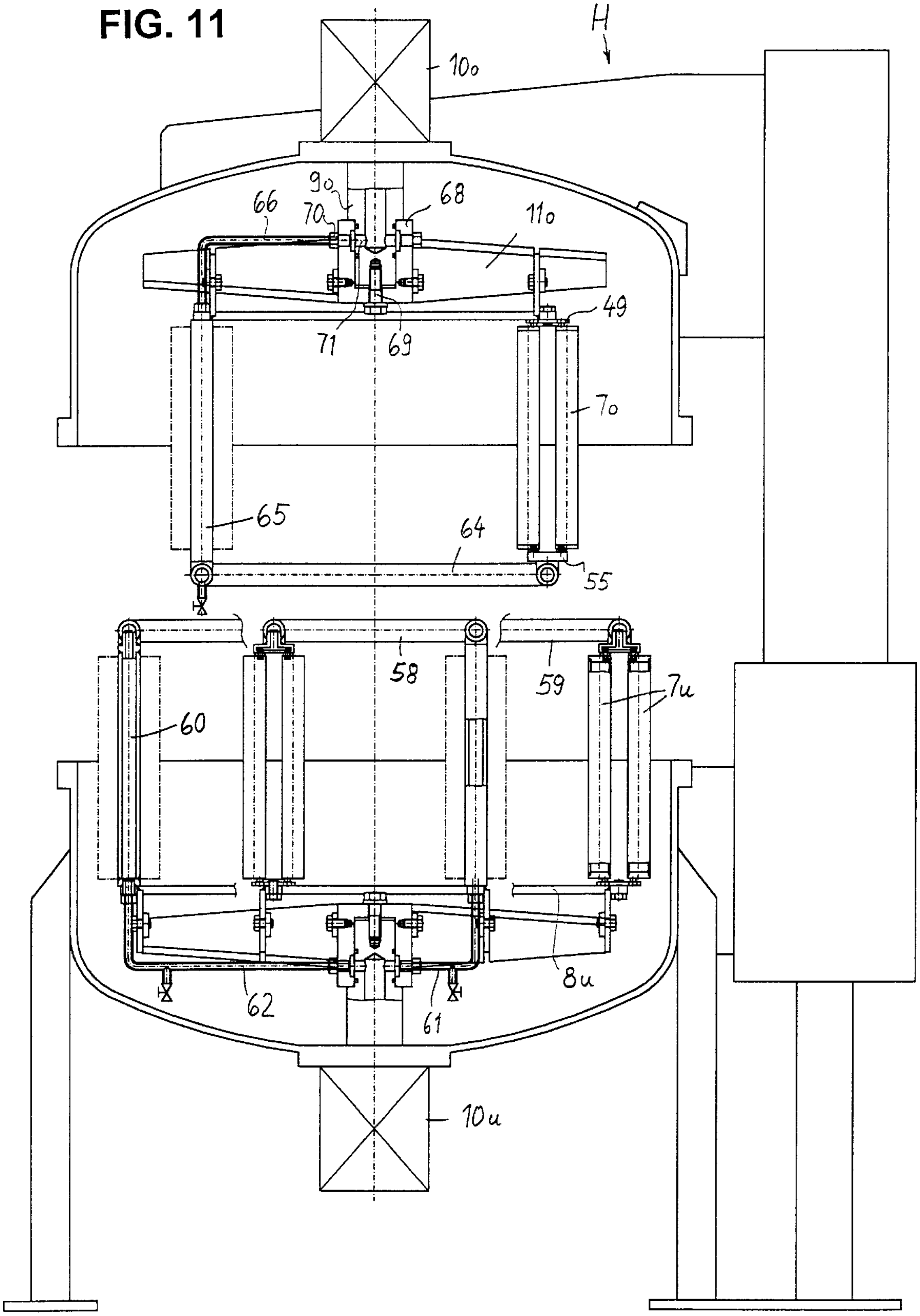
FIG. 11 is a view comparable to FIG. 10 in opened condition of the filter device.

It can be seen from the construction with the inner structures fully independent from one another and assigned to the upper and lower vessel shells 4*o* and 4*u* shown in FIGS. 1, 10 and 11, that when the vessel is separated at a radial level approximately in the center of the vessel 4 it is very easily possible to make said inner structure accessible for maintenance work. Thus, the vessel is separated at a central radial plane into the two shells 4*o* and 4*u* which are releasably connected to one another at two circumferential flanges 5*o* and 5*u*. Screws keeping the circumferential flanges 5*o* and 5*u* together are not shown for simplicity's sake. The upper vessel shell 40 with all elements supported and attached thereof can be lifted off the lower vessel shell 4*u* by means of a lifting device H. This state is shown in FIG. 11.

FIGS. 12*a* to 12*h* show a complete sequence by means of which the filter element groups arranged in the upper and lower vessel shells can be made accessible.

FIG. 12*a* shows the filter device 1 with a lifting device pivotally supported at a column in a manner adjustable in height in closed condition of the vessel.

In FIG. 12*b* the upper vessel shell 4*o* is lifted off the lower vessel shell 4*u* to such an extent that the filter plug group 7*o* supported at the upper housing shell 4*o* is completely free from the lower filter plug group 7*u* so that according to FIG. 12*c* the upper housing shell 4*o* can be freely pivoted to the side with all members connected therewith.

According to FIG. 12*d* the lifting device is lowered to such an extent that the lower filter plug group 7*u* can be gripped by means of a further extension arm A formed at the lifting device. At the same time, the upper filter plug group 7*o* is set onto a table. After releasing the upper filter plug group from its carrying structure, the filter plug group can be removed from the working range. This condition is shown in FIG. 12*e*.

Then, the lifting device is raised again so that the lower filter plug group 7*u* can be removed from the lower vessel shell 4*u* after being released from the lower carrying structure. This is shown in FIG. 12*f*. After pivoting the lifting device again into the condition shown in FIG. 12*g*, the lower filter plug group 7*u* can be set onto a table by lowering the lifting device (FIG. 12*h*).

The assembly is performed in the reversed order.

The release of the carrying structure with the filter plugs attached therein from the hollow shafts (see FIG. 12*e* and 12*f*) is especially advantageous, since thereby the filter plugs are freely accessible without being obstructed by the vessel shells. This release is especially facilitated by advantageous measures that are illustrated in FIG. 11. In the present case the upper carrying structure only is described, since the same applies for the lower carrying structure.

According to FIG. 11, the upper carrying structure 8*o* is attached at a pot 68, which is slipped onto the upper hollow shaft 9*o* from below and which is attached thereto by means of one single centric stud 69. The pot 68 has a connection 70 for the connection line 66, which is in alignment with a transverse bore 71 in the hollow shaft 9*o* to connect the connection line 66 with the interior of the hollow shaft 9*o*. After releasing the only stud 68, the pot 68 with the carrying structure 8o attached thereto can be released from the hollow shaft 9*o*.

In order to release a filter plug 7*o* from its consoles, the stud 55 of the filter plug must be screwed out of the thread in the head console 57. For this purpose, a tool can be applied at the hexagon socket 56. Caused by this unfastening process, the foot of the filter plug 49 approaches the foot console 49 in a manner that the enlarged foot 52 slides out of the slit bore 53 of the foot console so that the constriction 51 can be shifted through the slot 54 into the foot console, see in this connection especially FIG. 5.

As already emphasized, it is imperative for achieving the aim endeavored by the invention that the deposition of solid matter particles on the surfaces of the filter plugs is prevented to the best possible extent. This requires an intensive flow of the pulp around the filter plugs. In cooperation with a suitably selected speed of rotation of the hollow shafts which set the filter plugs in motion, the mutual distance of the filter plugs is also decisive in order to achieve suitable flow conditions at the surfaces of the filter plugs, since a gap is formed between adjoining filter plugs which has the effect of a nozzle. The adjustment of the width of this gap is therefore necessary. It depends in the position of the respective filter plug, i.e. whether the filter plug is located in the vessel radially more inwards or outwards. It also depends on the type of the pulp and of the speed at which the filter plugs rotate around the vessel axis. In order to make the filter device operative for the various purposes and in order to be able to appropriately adjust the gap widths between adjoining filter plugs, a support of the filter plugs at their consoles is provided according to the invention which enables to change the surface distance of the filter plugs within the subgroup by rotation in the bores formed in the consoles. This can be most easily managed when the mounting studs and the studs of the filter plugs are asymmetrically arranged at the filter plugs, as shown in FIG. 5.

Figure 13:
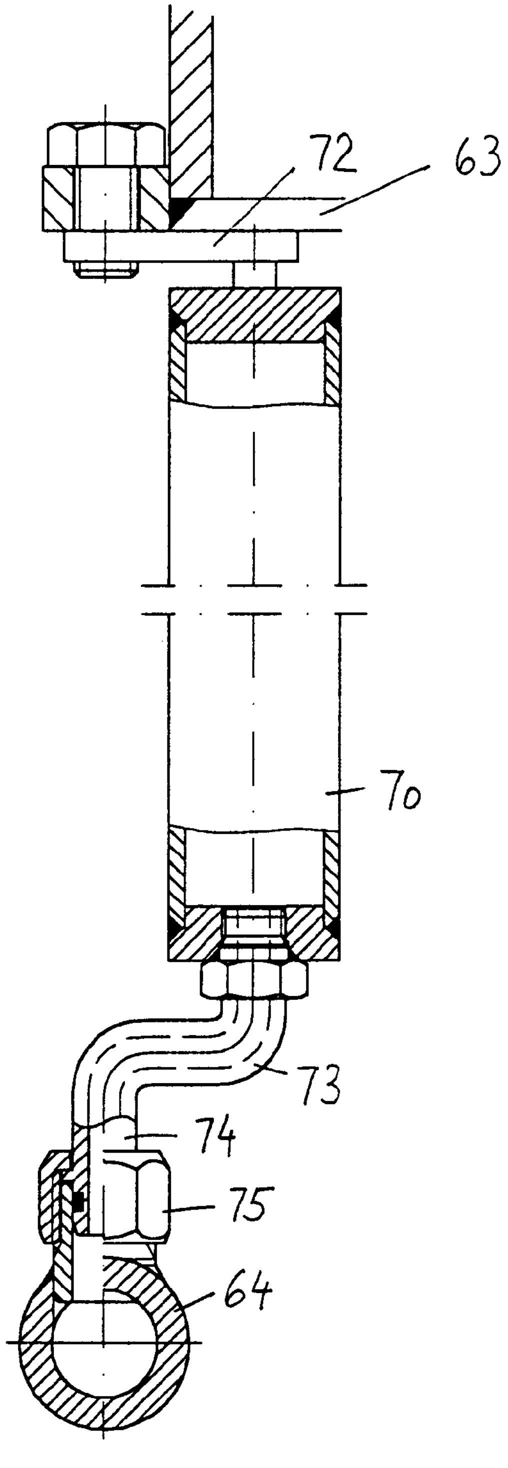
FIG. 13 show a side view of a further alternative of the filter plug support.

For the adjustable mounting of filter plugs, which comprise central supports, a solution is provided according to an embodiment of the invention, shown in FIG. 13, which uses connection elements bent at right angle. A connection element corresponding to the mounting stud 50 of FIG. 6 is screwed to a hole flange ring by means of a screw bolt, said hole flange ring being attached at the annular carrier 63 whereas the connection element corresponding to the stud 55 of FIG. 5 is hollow and inserted at one end into a bore of the filter plug and which comprises at the other end a gland terminal 74 with a union nut 75. It is self-evident that in this case the head console must be provided with a matching screw neck.

Figure 14:
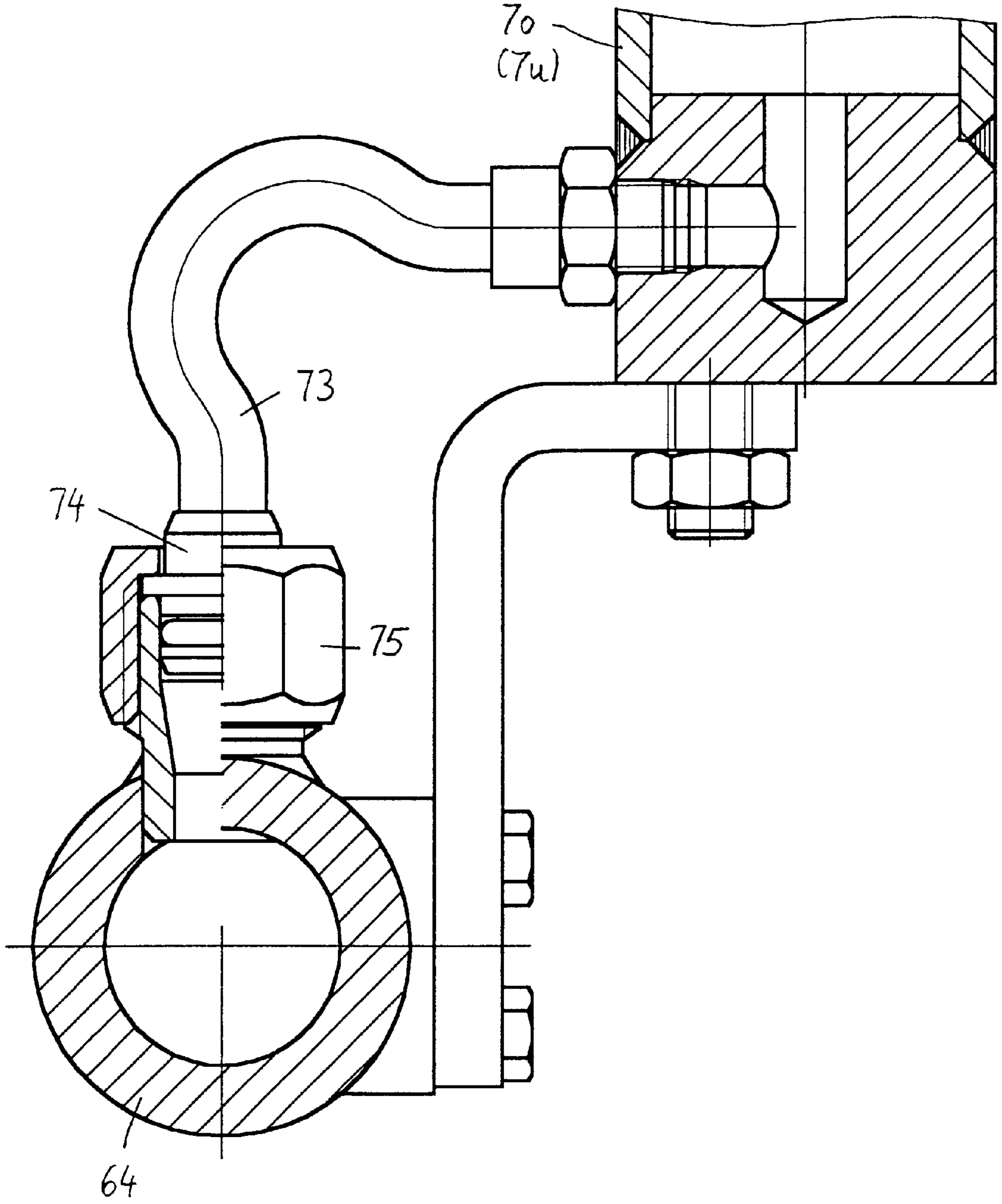
FIG. 14 show a detailed view of an alternative filter plug construction with a support.

A further alternative shown in FIG. 14 provides lateral terminals at the head and foot of the filter plugs 7*o* and 7*u*. The head of the filter plug is fastened to the annular tube 64 by means of an angle, and an angular connection fitting 73 is connected at the side of the head, said connection fitting ending in a manner comparable to the embodiment according to FIG. 13 in a glad terminal 74 and carrying a union nut 75.

Due to the relatively great flow quantity per cross-sectional unit near the center caused in the pulp, the gap widths between the filter plugs of a subgroup are adjusted there greater for practical application than at the filter plugs that are arranged radially more outwardly.

The hollow shafts with the carrying structures attached thereon including the turbines and the filter plugs are driven in opposite directions to avoid that a movement is caused in the pulp which more or less regularly follows the filter plugs so that a relative movement between the filter plugs is not generated. Furthermore, it is advantages if baffles 76 are formed at the inner wall of the vessel jacket (see FIG. 3), which disturb a flow running with the rotating filter plugs and which therefore contribute to the turbulence within the filter device.

For an optimum adjustment of the gap widths between the filter plugs it is furthermore advantageous if the gap widths between the filter plugs of adjoining subgroups can also be adjusted. This requires that the consoles are attached at their carriers or annular tubes in a manner that they can be brought to different angular positions and fixed therein.

Figure 15:
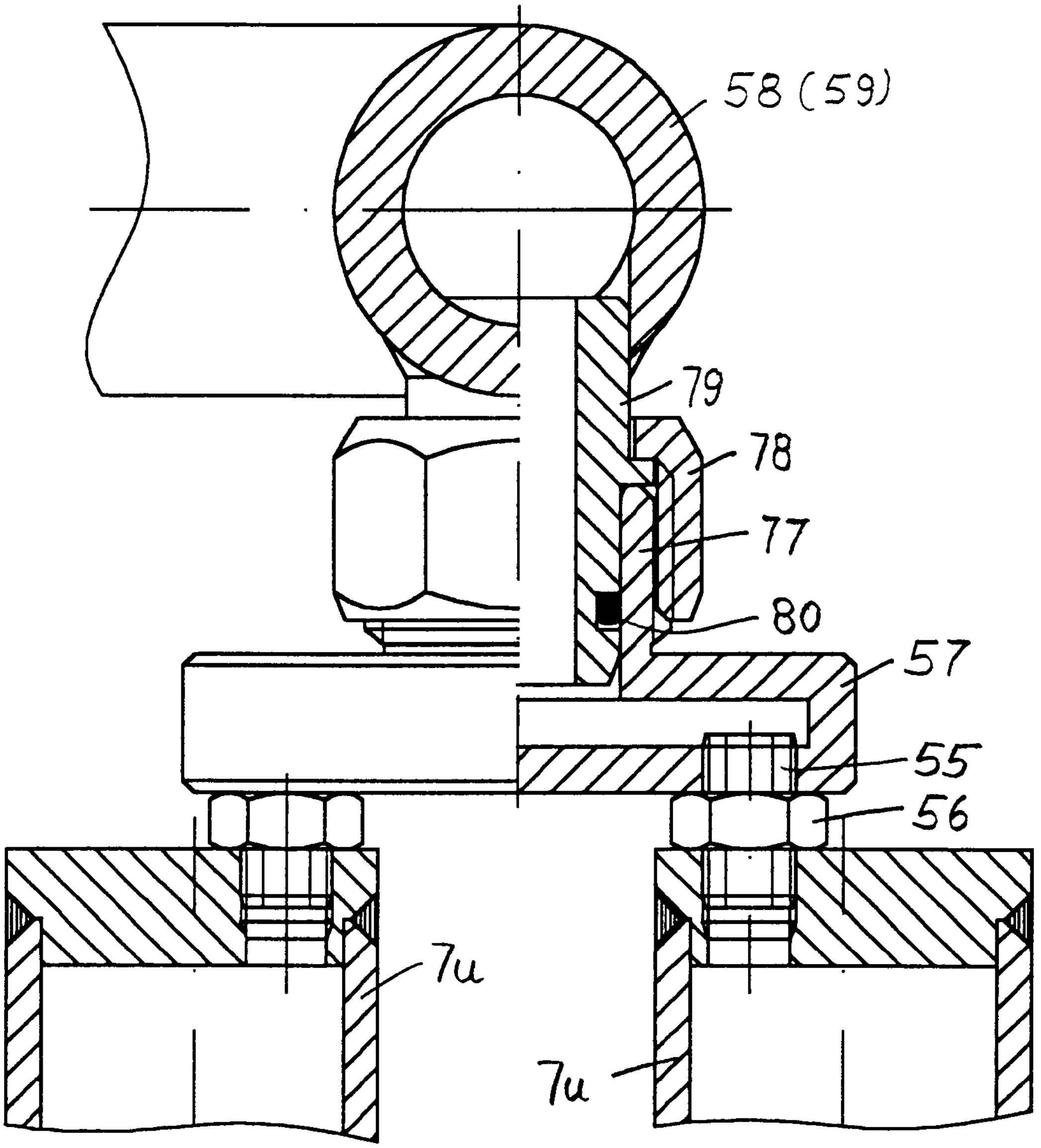
FIG. 15 show a detail of the alternative support of the filter plug heads.

FIG. 15 shows such a solution in which the head console 57 carries a screw neck 77 into which a pin 79 attached at the annular tube 58 carrying a union nut 78 is inserted, said pin being sealed in the screw neck 77 by an O-ring. By loosening the union nut 78 the head console 57 can be rotated in any angular position and can then be fixed by fastening the union nut 78. It is self-evident that the associated foot console 49 must be rotatable accordingly. In this respect, reference is made to FIG. 5 which shows that the foot console 49 is fixed by means of a thread bolt 81 at the carrier in a manner to be rotated in any angular position.

It is clear that a mounting principle of the consoles as described for the head console in FIG. 15 and the foot console in FIG. 5, can also be applied for the embodiment according to FIG. 9 in order to be able to rotate the elongate consoles at their carriers or annular tubes and in order to be able to fix them in the selected rotary position.

FIGS. 16*a* to 23 show different embodiments of filter plugs from the side an in a cross-sectional view. They all have in common that the terminals are arranged eccentrically there. The terminals can, however, also be arranged in the plug axis. The remaining shape of the plug is not affected thereby.

Figure 16B:
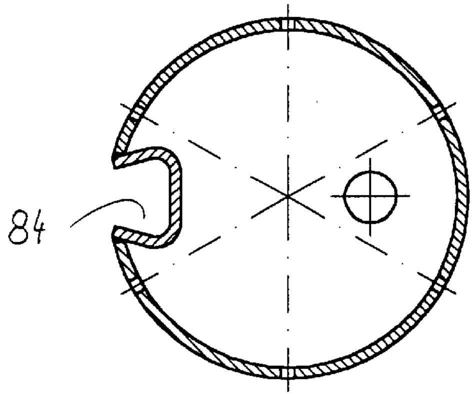
FIGS. 16*a* and 16*b* show an embodiment of a filter plug in side elevation view and in sectional view.
Figure 16A:
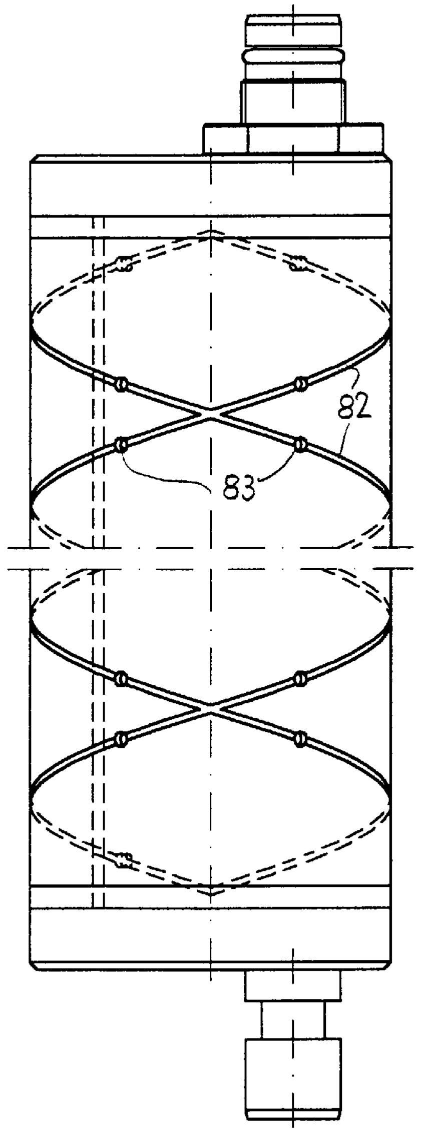

According to FIG. 16*a*, the filter plug comprises at its circumference a plurality of helical grooves 82, from which bores 83 lead into the interior of the filter plug. The filter plug is adjusted to be coated by a filter medium which is not shown in FIG. 16*a*. This filter medium is a rectangular cloth, the edges of which extending parallel to the axis having to be inserted into a groove 84 of the filter plug, which is formed in the surface of the filter plug in a manner parallel to the axis. After inserting the edges of the filter cloth into the groove, the groove is closed by a filling body, which pressed onto the edges of the filter cloth.

In the embodiment of FIG. 16*a*, the jacket wall of the filter plug has a relatively thin wall, since it is weakened by the comparatively few bores 83.

Figure 17B:
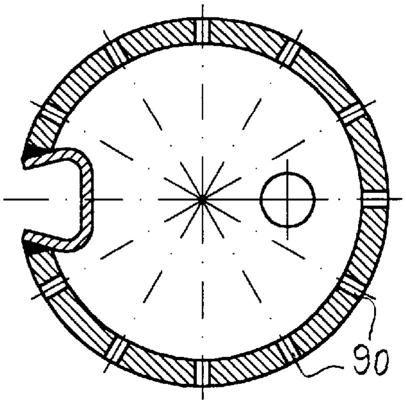
FIGS. 17*a* and 17*b* show a further embodiment of a filter plug in side elevation view and in sectional view.
Figure 17A:
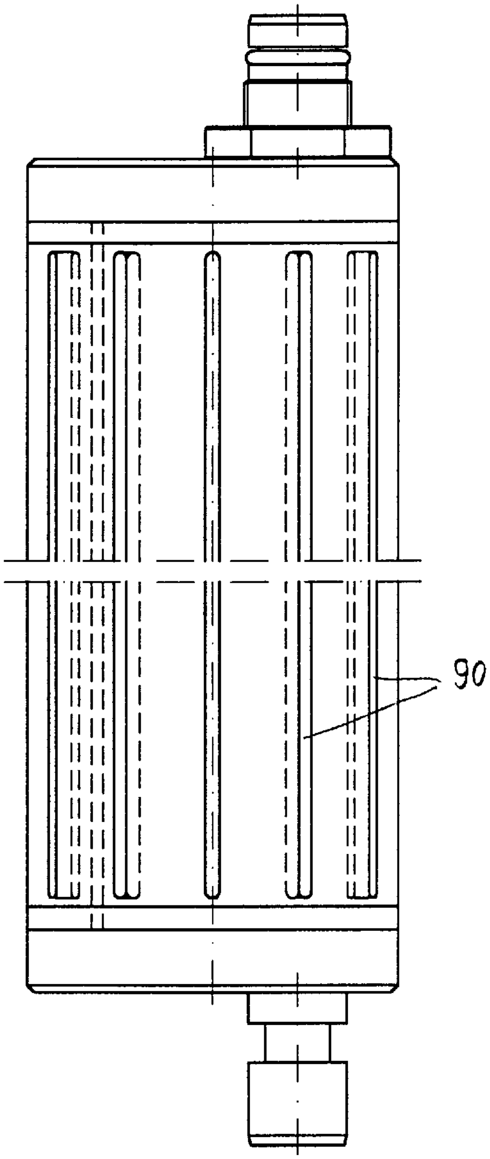

In the embodiment according to FIGS. 17*a*, 17*b*, a plurality of slits 90 are formed in the jacket wall of the filter plug, said slots extending parallel to the axis. For reasons of stability, the jacket wall of this embodiment is formed thicker compared to the embodiment according to FIGS. 16, 16*b*, as revealed by a comparison of FIGS. 17*b* and 16*b*.

Figure 18B:
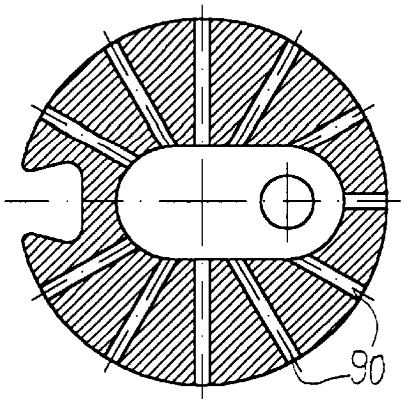
FIGS. 18*a* and 18*b* show a further embodiment of a filter plug in side elevation view and in sectional view.
Figure 18A:
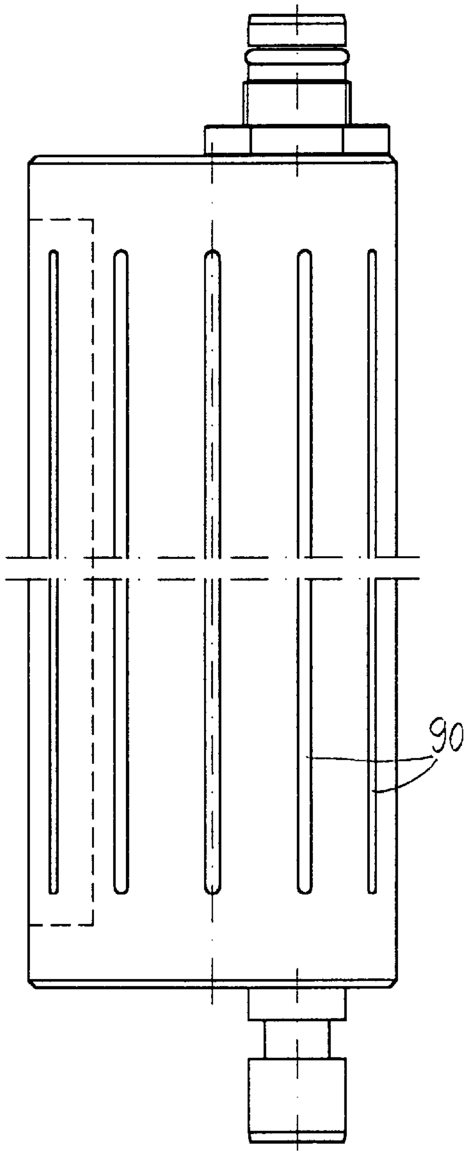

In the embodiment according to FIGS. 18*a*, 18*b*, the filter plug body is formed relatively massively. It has a comparatively small hollow space in its interior into which a plurality of slots 90 open, which drain filtrate (not shown) from the surface of the filter plug.

The attachment of support and filter cloths at the filter plugs is shown in different embodiments in FIGS. 19 to 23.

Figure 19:
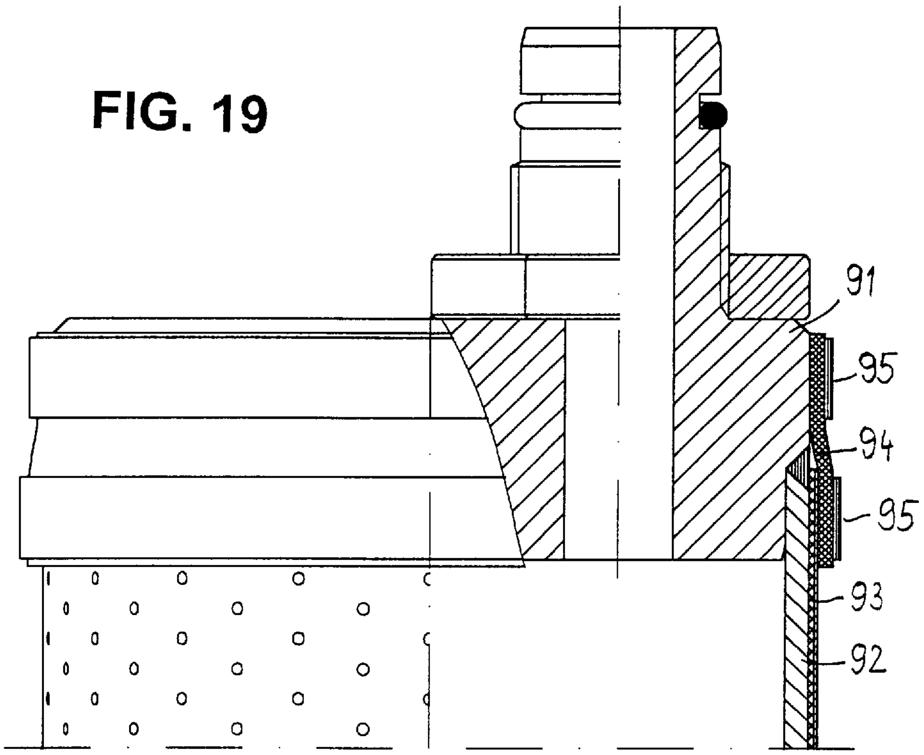
FIGS. 19 to 23 show as a selective view details of different embodiment of filter plugs in the head portion of the same.

In FIG. 19, the head portion of a filter plug can be seen at which a substantially cylindrical sieve 92 is attached as a carrier for a filter cloth 93. The filter cloth 93 is for instance a nose with an elastomer band 94 being pulled over the end of the nose attached at the head portion, said elastomer band being fixed by means of a metal strap 95. An additional sealing by an adhesive or sealing material is possible.

The arrangement in the area of the foot portion of the filter plug is similar so that a repetition of an explanation is not necessary.

Figure 20:
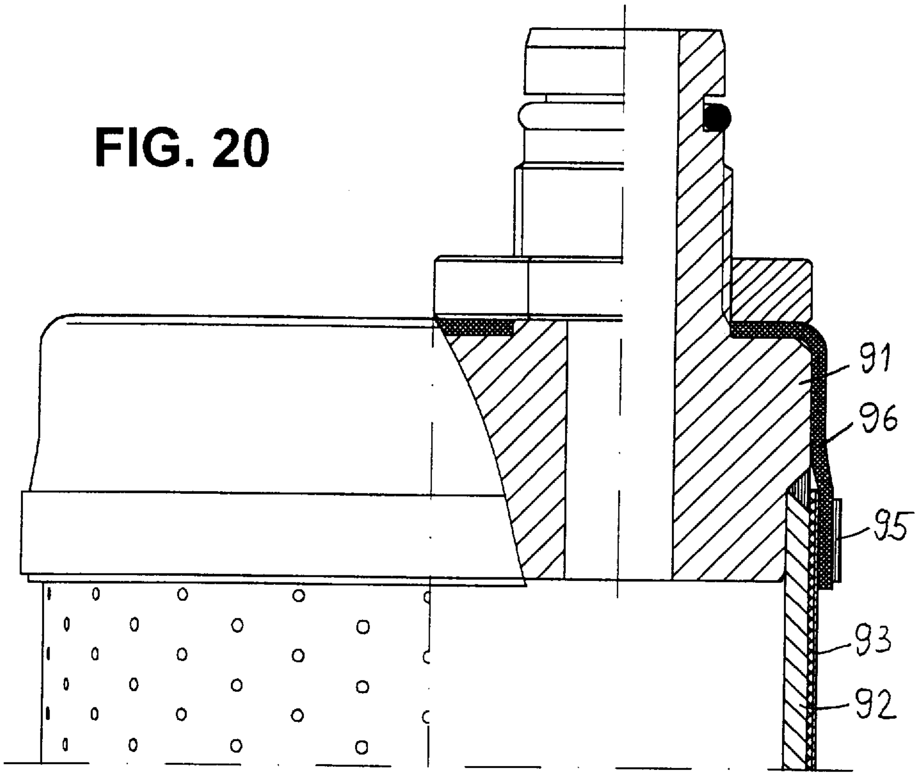

In the embodiment according to FIG. 20, an elastomer cap 96 is slipped over the head portion 91 of the filter plug and over the marginal portion of the filter cloth 93 and is fixed in the marginal portion of the filter plug by means of a strap 95. Additionally, a sealing can be made by means of an adhesive or sealing material. A respective construction also applies at the foot portion of the filter plug.

Figure 21:
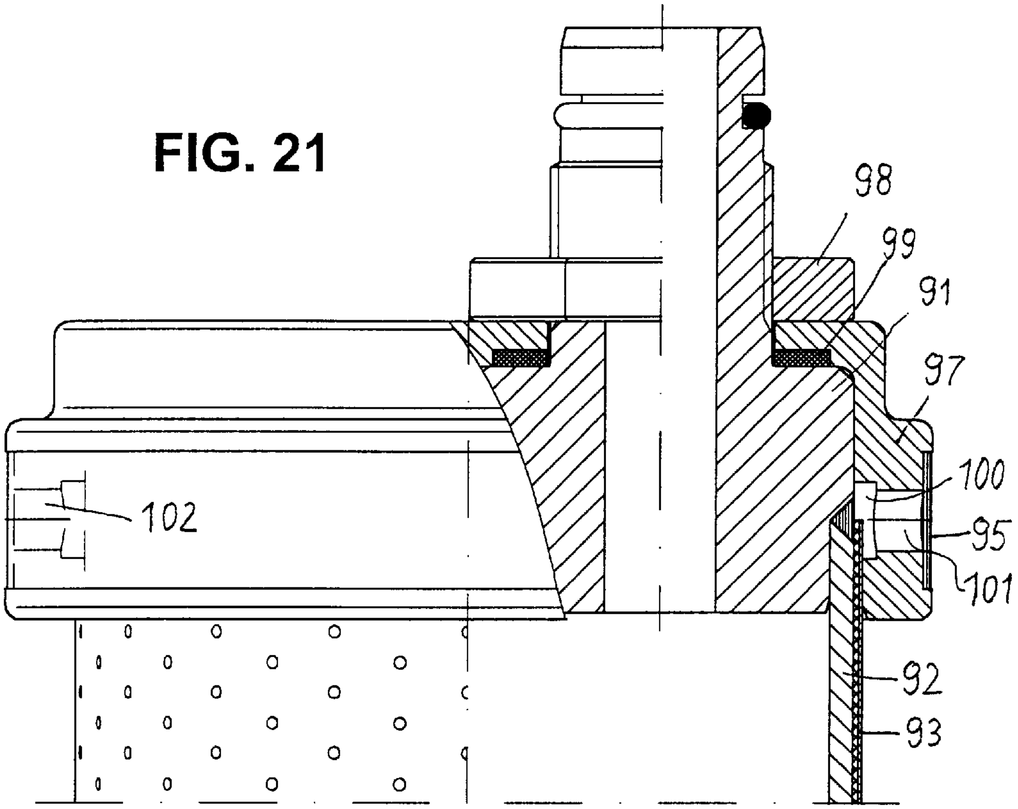

In the embodiment according to FIG. 21, a plastic cap 97 is slipped over the head portion 91 of the filter plug and the marginal portion of the filter cloth 93 arranged there. At the end side the plastic cap 97 is held by an adjusting nut 98 and sealed by an elastomer disk 99. The plastic cap 97 is radially sealed by an adhesive or sealing material in an annular gap 100, which is arranged above the edge of the filter cloth 93 and to which an inlet bore 101 and a diametrially opposite outlet bore 102 lead through which the adhesive and sealing material 100 can be injected into the annular gap 100. A strap 95 serves for additionally securing the plastic cap.

Figure 22:
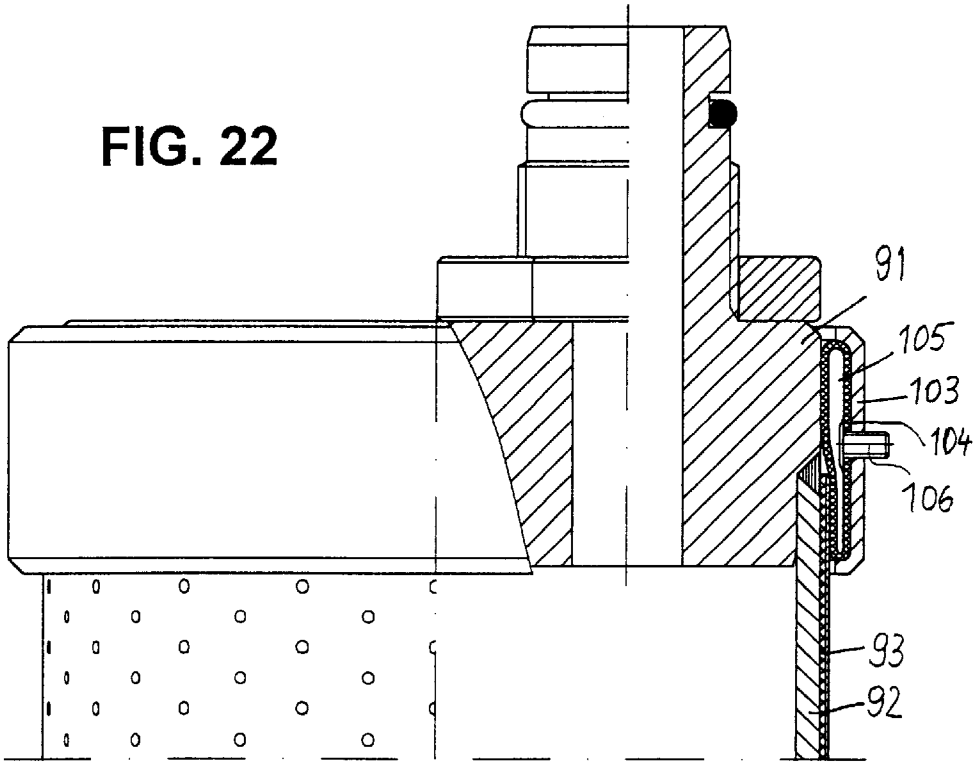

In the embodiment according to FIG. 22 the head portion 91 with the sieve 92 and the filter cloth 93 attached thereon is encompassed by a metal supporting ring 103, between which and the circumference of the head portion 91 and the marginal portion of the filter cloth 93 a swelling body 104 is located, the interior 105 of which being hydraulically or pneumatically loaded via a connecting stud 106 extending to the outside. The swelling body is supported at the metal supporting ring 103 and presses the marginal portion of the filter cloth 92 against the head portion 91 of the filter plug. Additionally, a sealing by means of adhesive or sealing material is possible.

Figure 23:
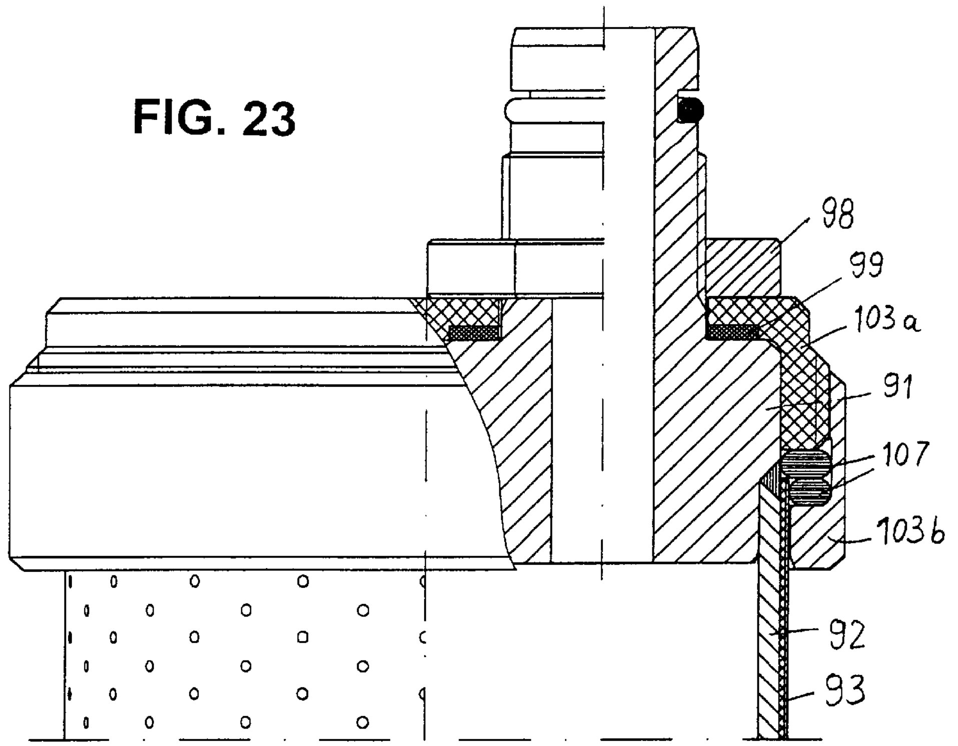

The embodiment according to FIG. 23 shows a two-piece metal cap 103*a* and 103*b* with a thread slipped over the head portion 91 of the filter plug and which similar to the embodiment according to FIG. 21 is secured by an adjusting nut 98 and sealed by an elastomer ring 99.

The two members 103*a* and 103*b* of the metal caps are screwed together with an interposed elastomer ring 107 shown in the present example, which when screwing together the tension rings are pressed between these two tension rings and form a seal or press against the marginal portion of the filter cloth 93. An additional sealing by means of adhesive or sealing material is also possible in this embodiment.

As explained above with the example of FIG. 19, the terminals at the foot members of the filter plugs are formed similarly in all embodiments.

It can be seen in all embodiments that it is possible by releasing the tension rings or the pneumatic or hydraulic pressure or the threaded connection to make the marginal portion of the filter cloth accessible so that the filter cloth can be released from the filter plug in order to be exchanged.

Figure 24A:
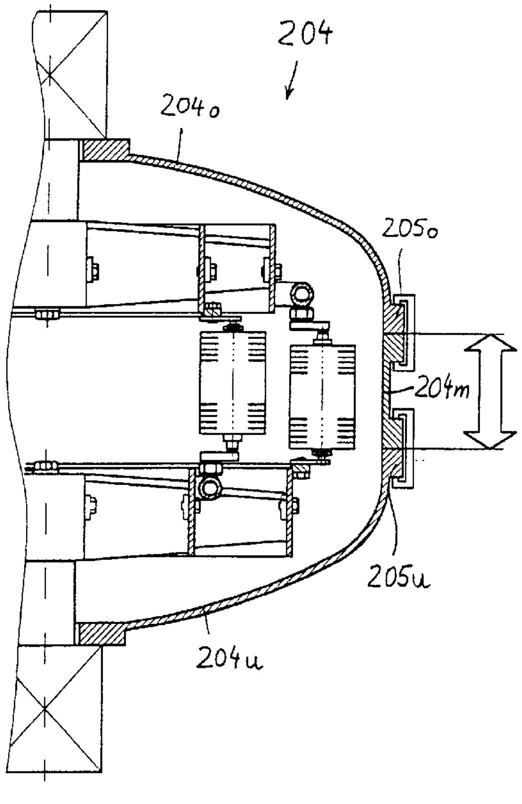
FIG. 24*a* shows as a selective view alternative embodiments of the vessel of the filter device of FIG. 1.
Figure 24B:
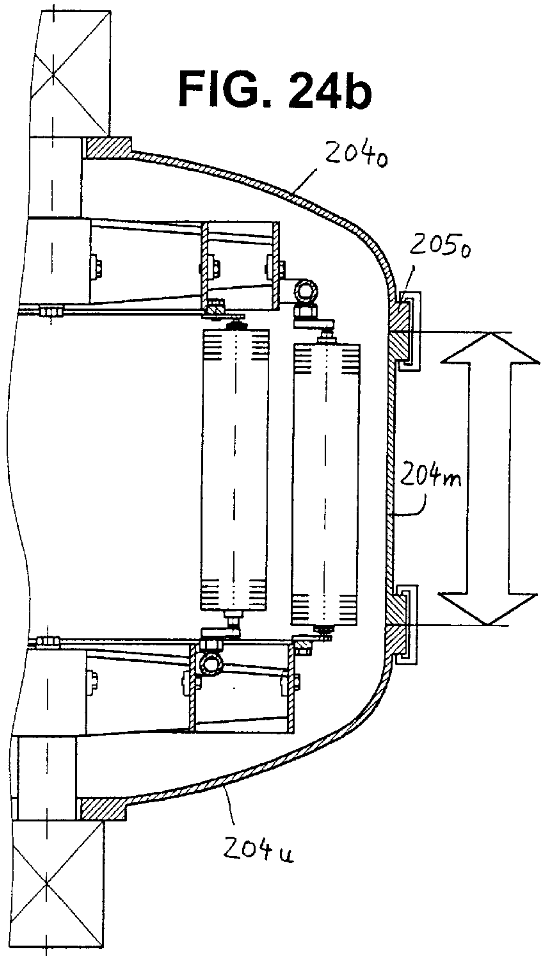

According to an embodiment of the invention which is shown in FIGS. 24*a* and 24*b*, the vessel 204 does not consist of two parts, as shown in FIG. 1, but of three parts. It consists of an upper head shell 204*o*, a lower head shell 204*u* and an interposed cylindrical jacket portion 204*m*, which is connected at the flanges 205*o* and 205*u* with the upper and lower head shells 204*o* and 204*u*.

As may be seen in FIGS. 24*a* and 24*b*, different axial lengths can be chosen for the jacket portion 204*m*, with the head shells 204*o* and 204*u* not being changed, wherein the axial lengths of the filter elements in the vessel 204 must be adapted appropriately. In this manner it is possible to produce filter devices of different capacities by means of a modular construction, wherein the majority of the constructive elements in invariable in all capacities and the adaptation to the desired power is carried out by means of components that are relatively simple to adapt, namely the jacket portion 204 and the filter elements. FIG. 24*a* shows as an example of a vessel 204 with a relatively short jacket portion 204*m*, whereas FIG. 24*b* as an alternative example shows a vessel 204 with a relatively long jacket portion. The explanation of further details is not necessary. Reference is made to the description of the above-mentioned Figures.

Figure 25:
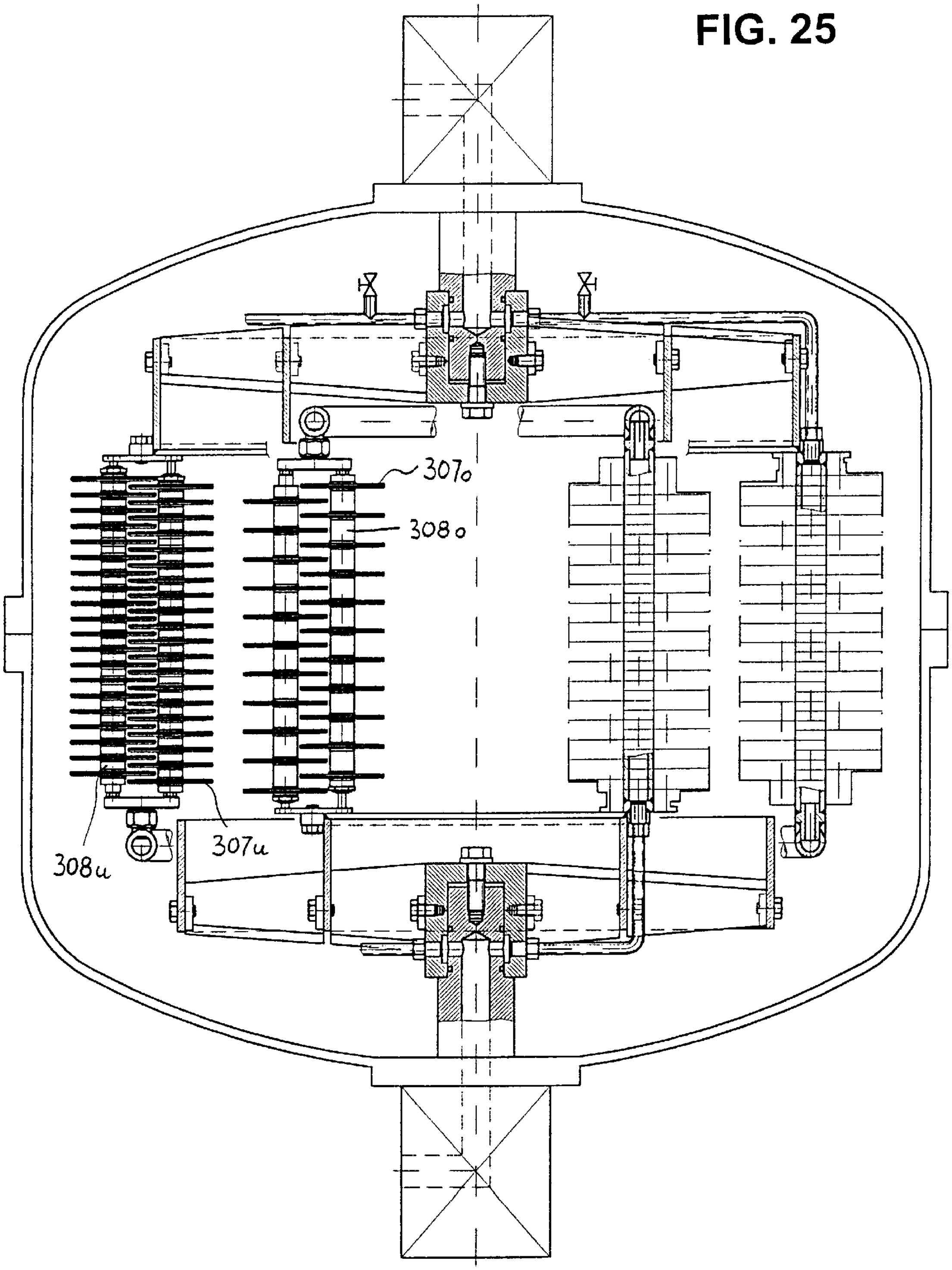
FIG. 25 is a longitudinal sectional view of a filter device with an alternative embodiment of the filter elements.

FIG. 25 shows an embodiment of the filter device in which the filter elements are not composed of cylindrical filter plugs, as in the above described embodiments, but of a stack of filter disks 307*o* and 307*u* arranged on a common carrier tube at mutual distance. The carrier tubes 308*o* and 308*u* holding the filter disks are held in a manner comparable to the above-described examples at the consoles, which in turn are attached at the already described annular tubes. To avoid repetitions, a detailed description is not necessary. The filter disks, however, deserve a precise description. This shall be made with reference to FIGS. 27 and 28.

Figure 26:
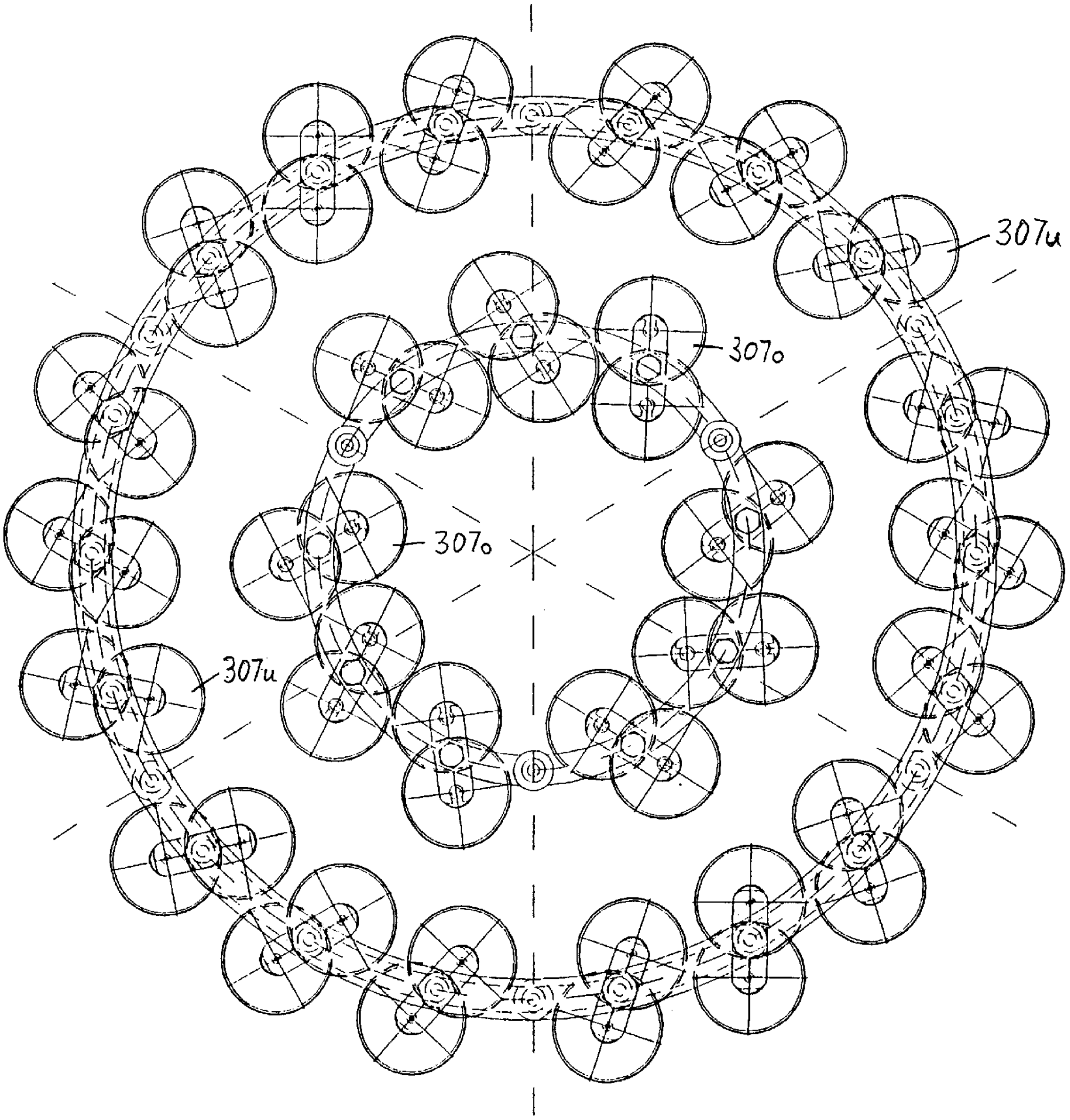
FIG. 26 shows an axial sectional view through the filter elements of FIG. 25.

A schematic radial cut view of the filter element arrangement within the filter device of FIG. 25 with a part of the carrier structure is shown in FIG. 26.

Figure 27:
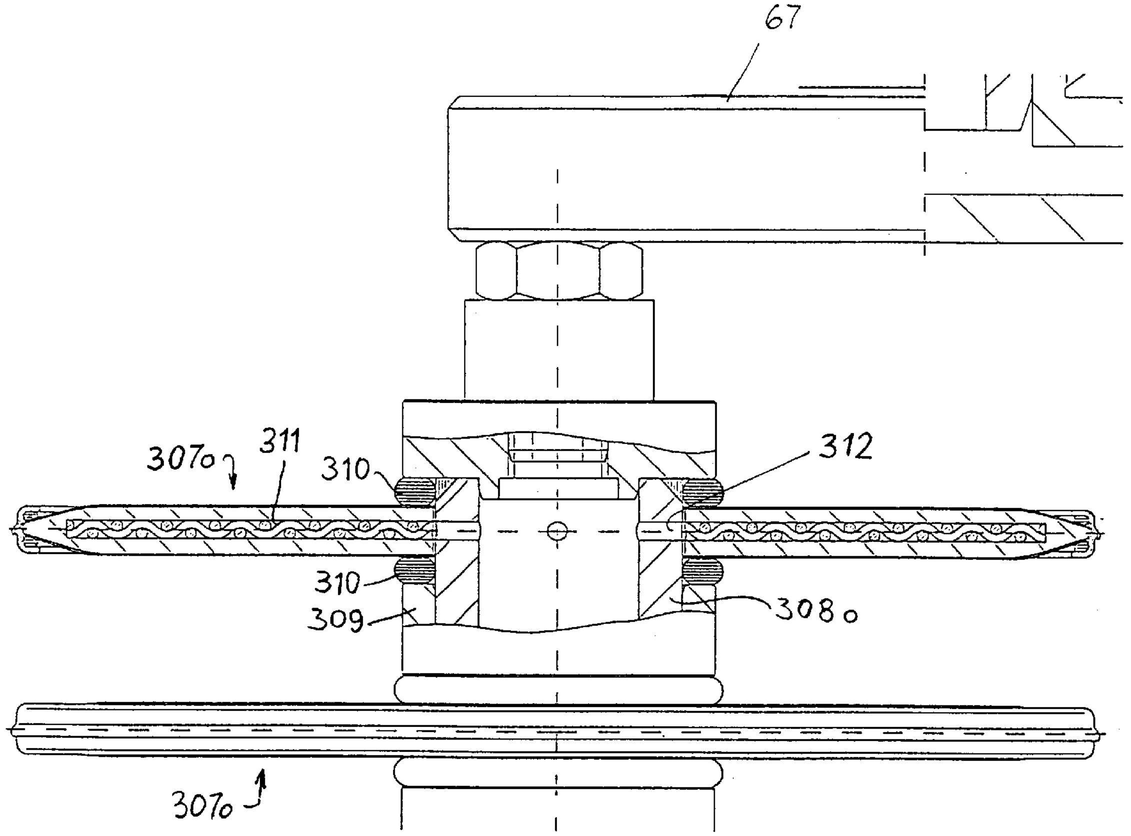
FIG. 27 shows a detail of an enlarged partial view of a filter element of FIGS. 25 and 26.

Each filter element consists of a stack of filter disks, with two filter disks 307*o* being shown in FIG. 27. The filter disks 307*o* of a stack are held by a carrier tube 308*o*, wherein spacer members 309 and sealing rings 310 are inserted which hold adjoining filter disks 307*o* at a mutual distance. The filter disks 307*o* each comprise a hollow inner space 311 (also see FIG. 27), which is drained by at least one associated hole 312 in the carrier tube 308*o* into this carrier tube. The carrier tubes are drained at the one end over the carrier console holding them in a manner fully comparable to the already described filter plug, see in this respect also FIG. 27, upper section of the drawing.

Figure 28:
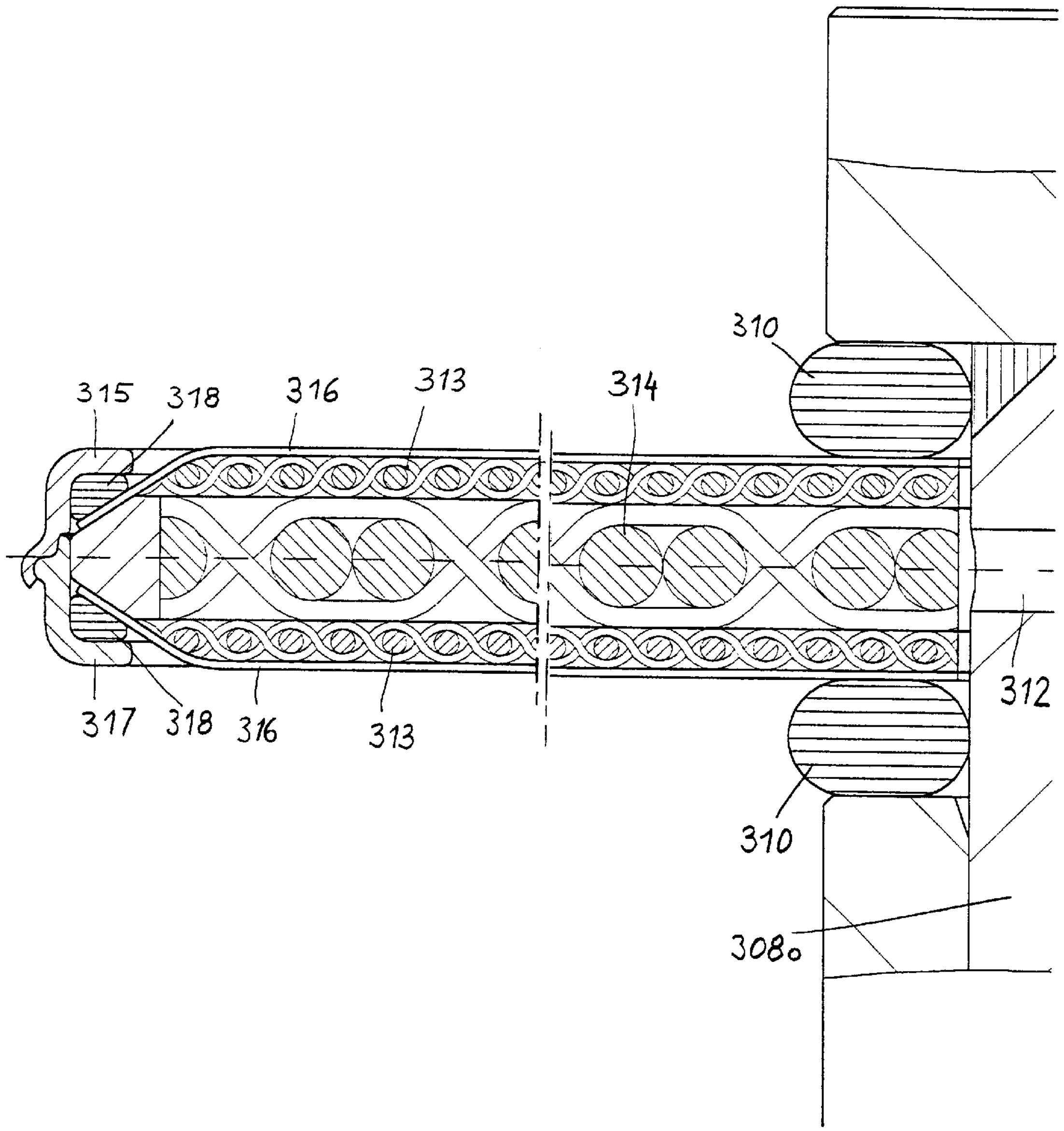
FIG. 28 shows a sectional view of an embodiment of a filter disk of the filter device of FIG. 5.

FIG. 28 shows a possible embodiment of the inner structure of the filter disks 307*o* and 307*u*. In the embodiment according to FIG. 28, the two close meshed grid structures 313 are held on a mutual distance by a large meshed grid structure 314. The close meshed grid structures 313 are covered on their surfaces by filter cloths 316, which are held at the edge of the filter disk by an axially separable tension ring 315, 317 clamping O-rings 318. The members 315 and 317 of the tension ring comprise an elastic circumferential lock in order to be able to open the tension ring for exchanging the filter cloths. In the proximity to the carrier tube 308*o* and 308*u* the filter cloths 316 are fixed and sealed by the above-mentioned O-rings 310.

A rigid, porous, disk-shaped hollow body can be used as a carrier for the filter cloths, with the filter cloths being fixed by a cast material at the edge of the hollow body. The cast material fills a hollow space between a ring and the edge of the hollow body. Furthermore, it is possible to form the filter cloth in one piece so that it covers the upper and lower side of a rigid, porous, disk-shaped hollow body, so that an attachment of the filter cloth must only be ensured in the area of the carrier tube.

The structure incorporating the filter disks has the advantage that filter elements forming a subgroup can be mounted in such close proximity that in case of an existence of a mutual axial offset, the filter disks of the one filter element penetrate into the spaces between the filter disks of the adjoining filter plugs. This can clearly be seen in FIGS. 25 and 26.

Figure 29A:
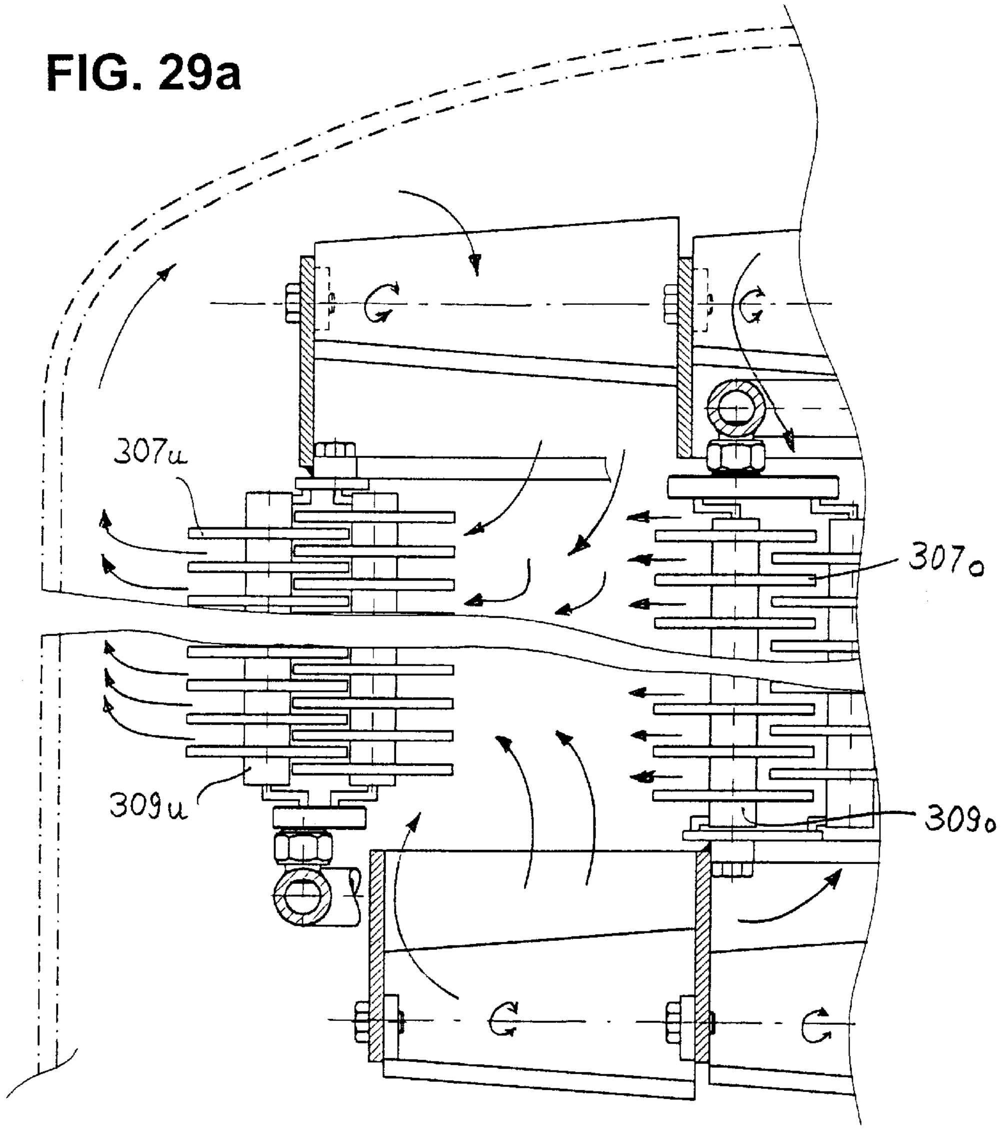
FIGS. 29*a* and 29*b* show an enlarged section of FIG. 25 to explain the flow ratios and a schematic cross-sectional view thereof.

As shown in FIG. 29A, this leads to the consequence that the free cross-section that is found by a flow flowing against this filter element subgroup constricts from a great cross-section in the direction towards the overlapping portion of the filter disks to a small cross-section and subsequently enlarges again. This leads to a nozzle effect for the pulp flow within the filter plug subgroup. This nozzle effect and the pressure reduction connected therewith draws the pulp into the subgroup and improves the flow over the filter surfaces.

It is clear that the mutual distance of the filter elements in this embodiment can also be provided in a variable manner comparable to examples of FIGS. 1 to 24 in order to enable adaptations to the working conditions.

Figure 29B:
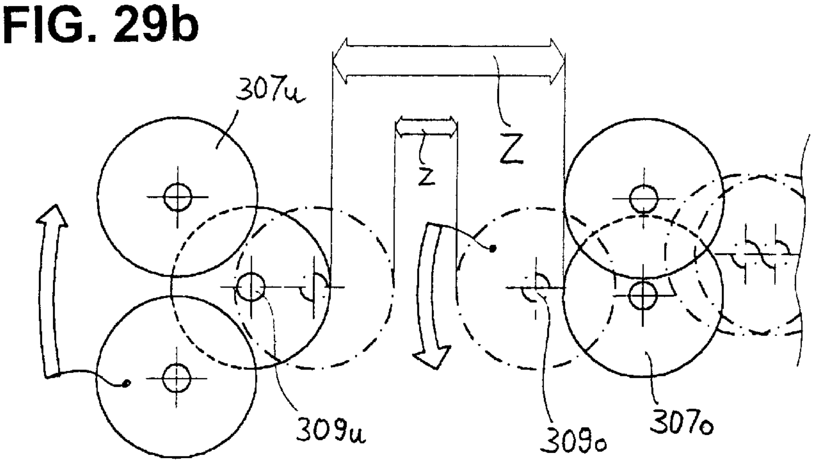

It is, as shown in FIG. 29*b*, also possible to vary the distance between the filter element groups by rotating the consoles at their carrier structure and—due to the bend of the support of the ends of the carrier tubes 309*o* and 309*u*, respectively—by rotating the filter elements at their consoles. FIG. 29*b* shows in full lines an arrangement which leads to a broad space Z, and shows in dotted lines an arrangement which leads to a narrow space z. Distances alternating in the circumferential direction of the space can be provided to vary, in particular enforce, the pulsation effect within the pulp which results by the passing of the filter element groups past one another.

FIG. 26 also shows that the very narrowly arranged filter elements, practically penetrating themselves mutually, together form a kind of cage, which except for the spaces between the filter disks is closed at its circumference. This leads to the result that the pulp flows axially pumped by the turbines generate a pressure difference between the center of the filter element arrangement and the periphery thereof which reduces via the cage structures. This pressure difference generates a dynamic pressure at the filter disks which presses the filtrate (permeat) through the membranes without requiring to set the pulp under a hydrostatic pressure. This analogously applies for the embodiment with cylindrical filter plugs.

Figure 30:
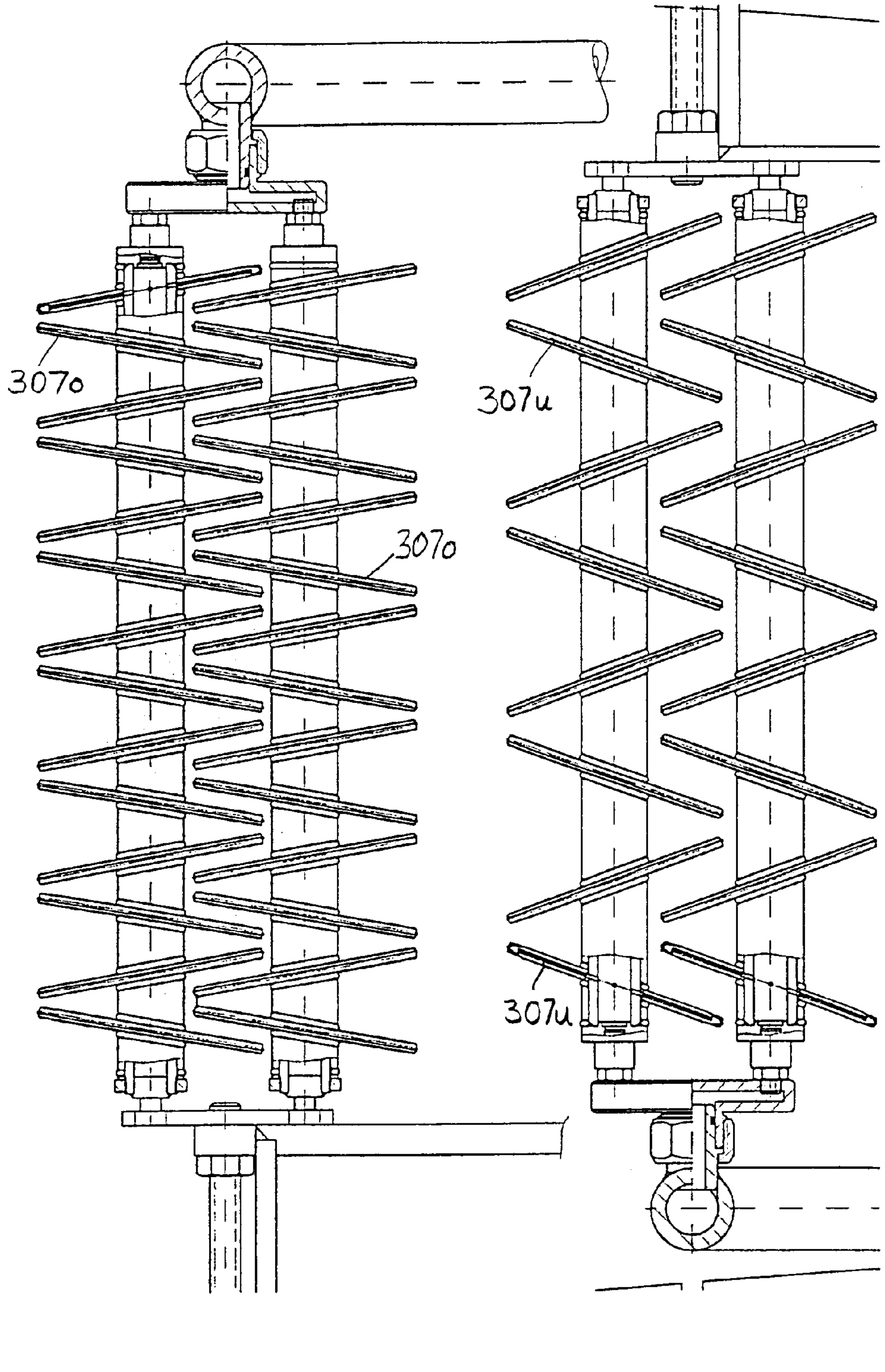
FIG. 30 is a partial view of an embodiment modified with respect to FIG. 25.

An alternative of the embodiment of FIGS. 25 to 28 is shown in FIG. 30. In this embodiment the filter disks 307*o* and 307*u* are arranged at an angle of inclination with respect to the axis of the respective carrier tube 308*o* and 308*u*, with an alternating positive and negative angle of inclination, wherein these angles of inclination are all defined with respect to a common axial plane. That means that two adjoining filter disks define a gap between them which constricts from a marginal point of the filter disks arranged in this axial plane towards a diametrally opposite marginal point of the same filter disk. The filter disks adjoining at both sides of a filter disk are therefore parallel to one another.

The angles of inclination can be chosen differently. In the embodiment shown, they are greater in the filter disks 307*u*, which are closer to the circumferential axis (not shown), i.e. they deviate more from the arrangement perpendicular to the carrier tube axis than in the filter disks 307*o* farther away from the circumferential axis. Thus, the different radial components within the pulp flow caused by the turbines (not shown) are taken into account.

Furthermore, the filter elements of a subgroup may be arranged as in the example of FIG. 25 in a manner that the filter disks of two filter elements overlap each other, wherein the arrangement is chosen such that sections of second upstream filter disks of the one filter plug approaching one another seen from the tubular axis enter into the space between the sections of two filter disks of the adjoining downstream filter plugs, said sections being spaced apart seen from the tubular axis. In FIG. 30 this is shown in a very illustrative way. Thereby a nozzle effect is generated which draws pulp into the gaps which form the downstream filter disks with the upstream filter disks. The filter plugs arranged in a radially more inward manner are arranged up-stream, whereas the filter plugs arranged radially more outwardly are arranged downstream.

The orientation of the openings each formed by two filter disks, can be chosen that these openings are directed towards the center of rotation. The orientation can, however, also be chosen such that the flow by pulp generated by the rotation of the filter element groups around the center of rotation enters into the constricting gap between two filter disks, i.e. the filter disks rotate with respect to the aforementioned orientation. The selection of the adjustment depends on the kind of the respective pulp and the speed of rotation of the filter element group determined thereby and the power of the pump flow.

Figure 31:
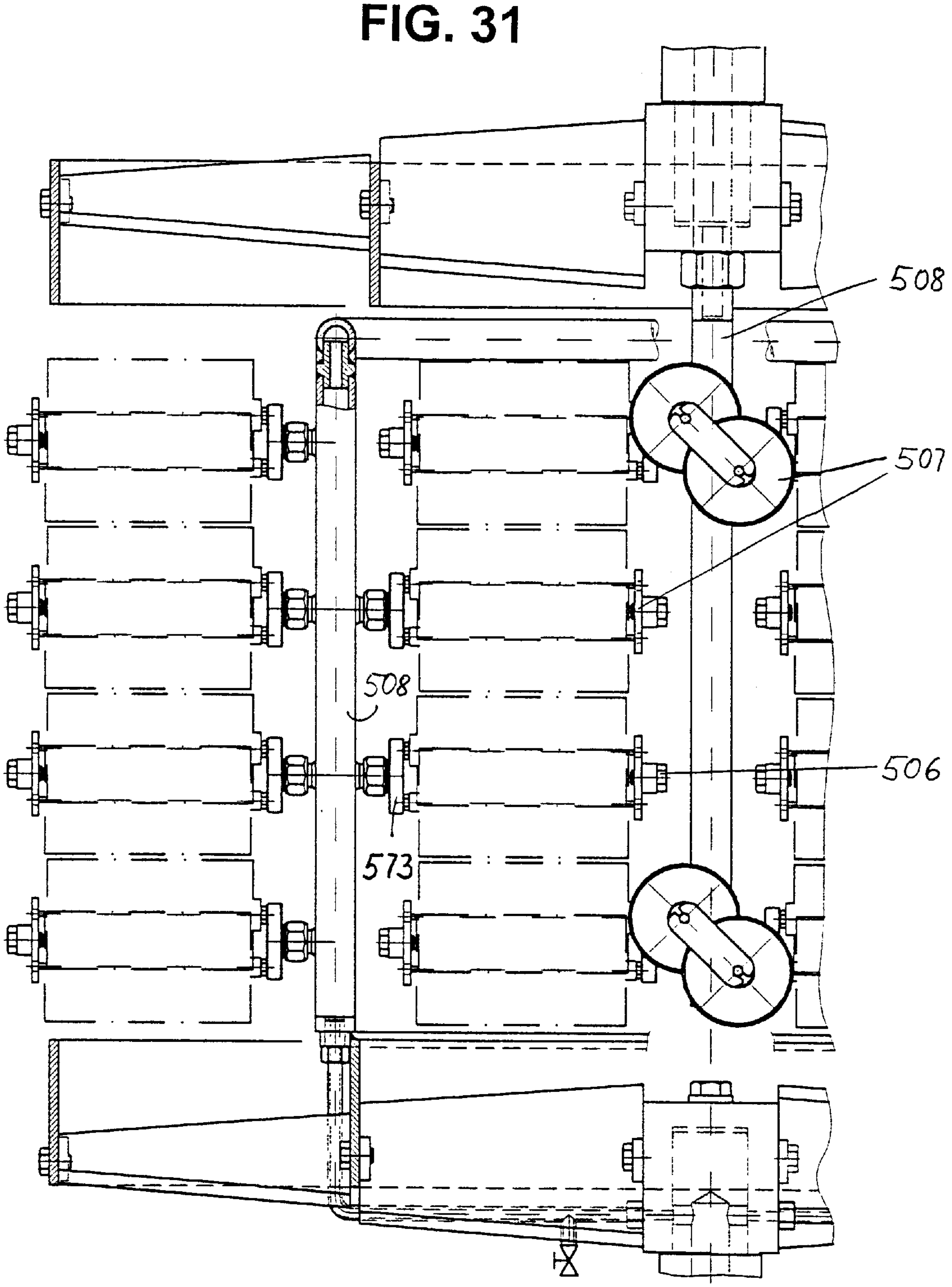
FIG. 31 shows as selective view a side elevation view of a further alternative filter element arrangement.

A different alternative is shown in FIG. 31. According to FIG. 31 holding tubes 506 radially projecting from a carrier tube 508 are attached at the carrier tube through connection consoles 573. A packet of filter disks 507 arranged in parallel to each other is attached on each holding tube 506, said filter disks 507 being provided according to the type of filter disks of FIGS. 27 and 28. Similar to the embodiment according to FIG. 27, these filter disks 507 are kept at a distance and they are sealed at the holding tube 506. The filter disks 507 are drained via the holding tubes 506 and the connection consoles 573 into the carrying tube 508, which in turn is drained via the carrier structure. A central carrying tube rotates in the circumferential axis of the carrier structure. The other carrier tubes rotate around circular paths around this axis of rotation.

Due to the connection consoles 573, the holding tubes 506 can be adjusted at the carrying tubes 508 in a manner that two adjoining filter element pairs, each consisting of two packets of filter disks 507 at their associated holding tubes 506, can be changed in mutual distance to each other. Furthermore, it is also possible to provide the individual packets with bent feet and heads. Then the two packets of a pair can be adjusted in mutual distance.

By the aid of FIGS. 32 to 34 it shall be shown how an apparatus according to the invention to perform the method can be accommodated in a space-saving manner in a housing enclosing the apparatus.

FIG. 32 shows the visible side of the housing 1208 with viewing windows 109 and a display and control panel 110.

FIG. 33 shows the housing from the side in opened condition. The apparatus consisting of the filter device 1 and the pressing dryer 2 can be seen therein.

FIG. 34 shows a view into the housing 108 from the top. The pressing dryer 2 having a relatively small volume can be seen at the side and displaced towards the front next to the filter device 1 having a relatively large volume. Furthermore, boxes 111 can be seen which serve for accommodating electric and electronic switching and control means.

The completely new filter element constructions provided by the invention according to FIGS. 25 to 34 enable to realize filter devices that are operative without a hydrostatic pressure, since the pressure drop required for the filtering of a pulp is generated only by the filter media through the flows caused by the movement of the filter elements.

Figure 35:
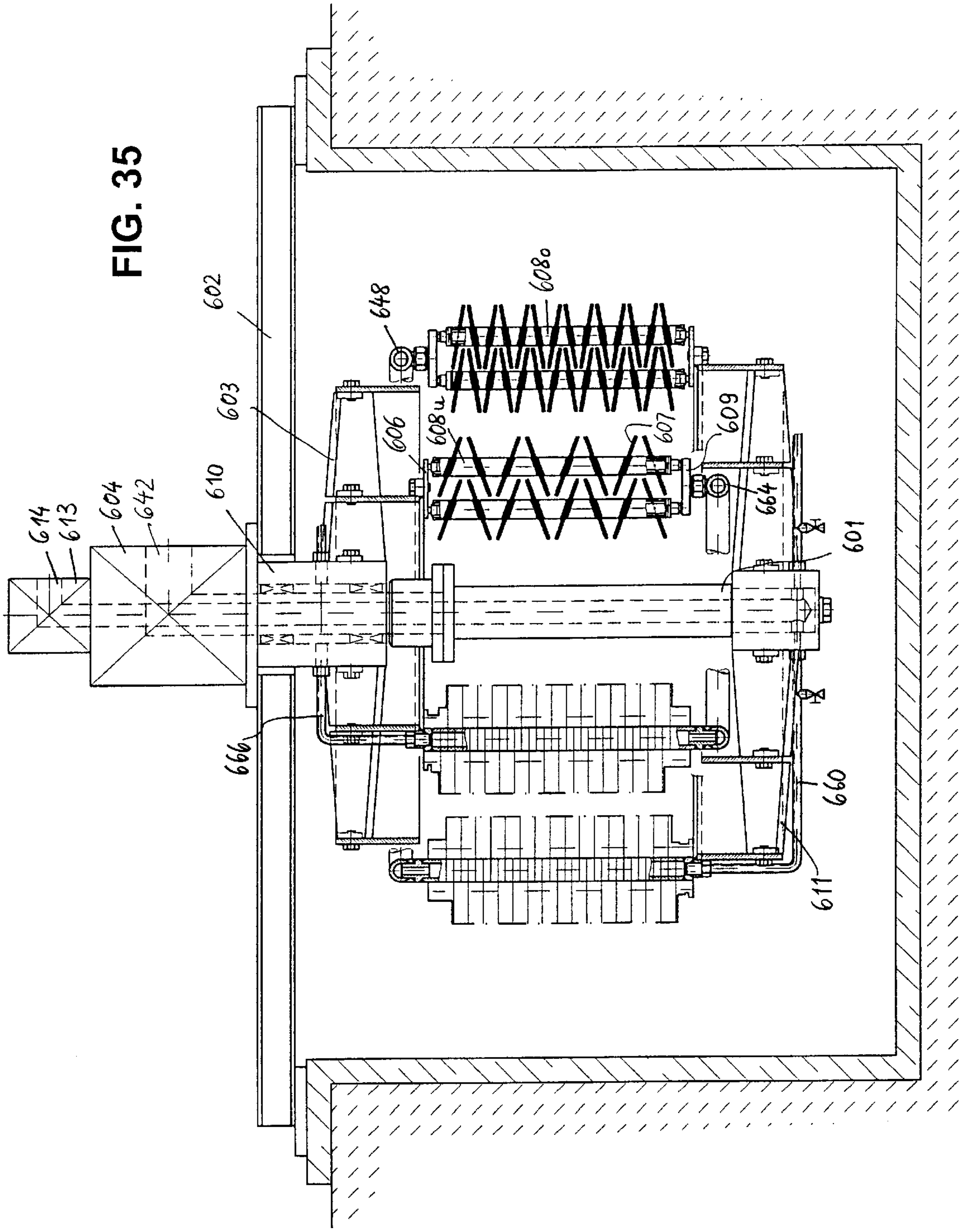
FIG. 35 shows an embodiment of a filter device with one drive only for freely submerging into a possibly pressureless container, and FIG. 36 schematically shows the flow ratios produced in the filter device according to FIG. 35 during operation in the pulp to be filtered.
Figure 36:
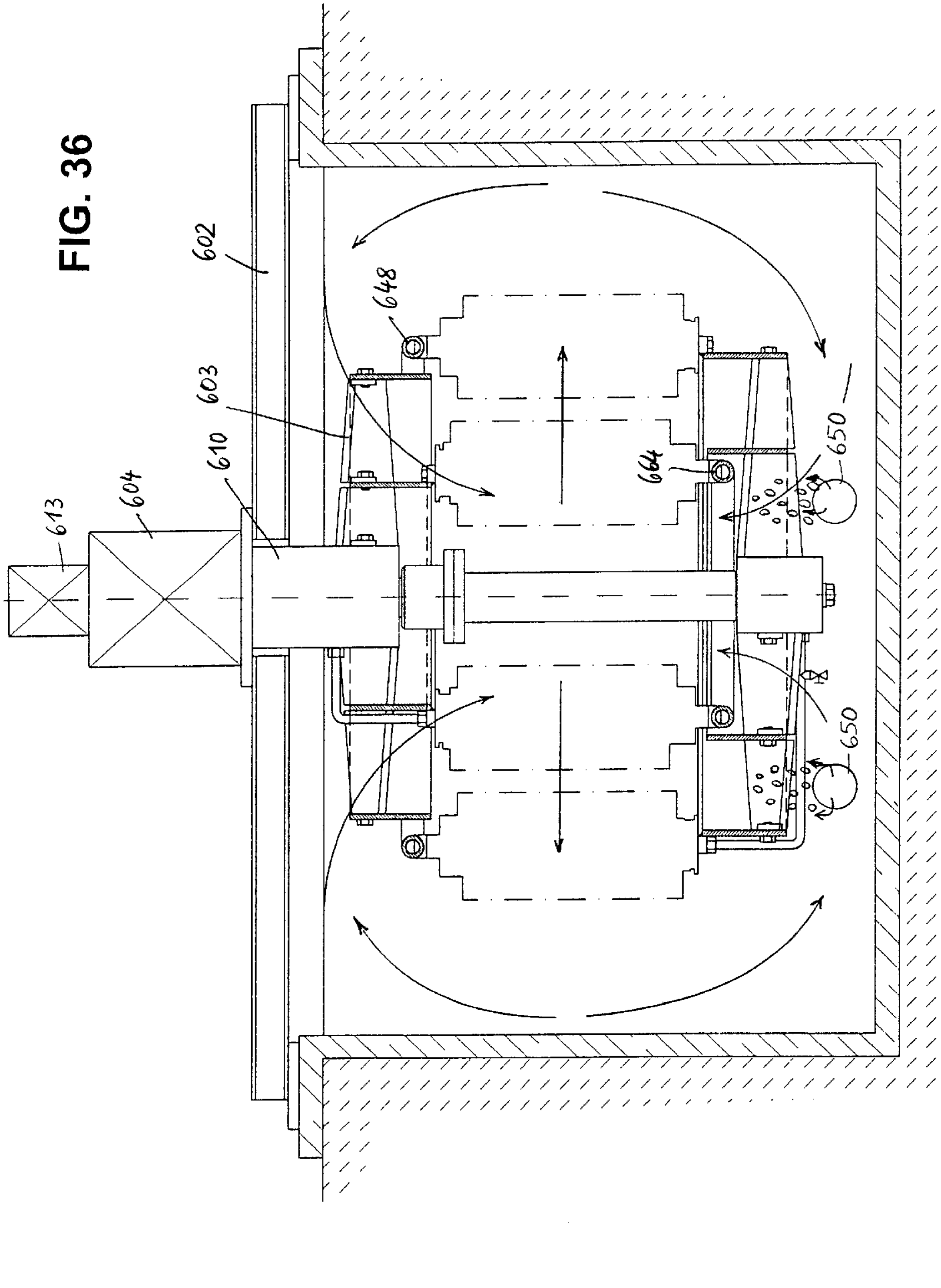

Thus, it is possible according to the embodiment of a filter device according to FIGS. 35 and 36 to submerge a filter unit with movable filter elements into an open tank or a put or the like, and to build up a pressure difference at the filter media without pressure-loading the pulp or exerting a vacuum onto the filtrate side, said pressure difference being suitable to generate a filtering process. The transverse flow prevailing at the filter media prevents that the pores of the filter media are filled early by solid matter particles.

The filter unit according to FIG. 35 consists of a central hollow shaft 601 rotatably supported at an upper carrier beam 602. An upper transverse carrier 603 is rotatably supported at the hollow shaft 601 below the carrier beam 602 and in close proximity thereto, said transverse carrier having a hydraulic drive 604 of its own. The upper transverse carrier carries a plurality of first filter element subgroups, which are arranged on at least circular ring and which consist of a plurality of filter elements extending in parallel to the hollow shaft 601, which are designed according to FIG. 30, i.e. they each consist of a stack of filter disks 607, which are inclined alternately in positive and negative directions with respect to the carrier tube 608 holding them. The carrier tubes of a filter element subgroup are connected at their upper end with a common head console 606, which is attached to the upper transverse carrier 603. The carrier tubes 608 are attached in multitude at a foot console 609 at the ends opposite to the transverse carrier 603. The foot consoles 609 are hollow and are in fluid communication with the interiors of the carrier tubes 608 attached thereto.

The foot consoles 609 are attached at a common annular tube 664. The interior of this annular tube 664 is connected through a connection tube 66 to an upper bearing bushing 610, at which the upper transverse carrier 603 is also attached, said bearing bushing being drivable by the hydraulic drive 604. Thus, the interiors of all filter disks 607 are connected to a common outlet via the bearing bushing 610 and a rotary coupling.

The upper transverse carrier 603 is provided with turbine blades, which upon rotation of the upper transverse carrier cause an axially downwardly directed flow in the pulp into which the filter unit is submerged, cf. FIG. 36, top.

At the lower end of the hollow shaft 601, a lower transverse carrier 611 is fixed for co-rotation. This transverse carrier carries a plurality of second filter element subgroups which are arranged on at least a second circular ring concentric to the first circular ring, and which consist of a plurality if filter elements extending in parallel to the hollow shaft 601, which are also designed according to the kind of FIG. 30.

The second circular ring in the example shown has a greater diameter than the first circular ring, and the angles which adjoining filter disks of the respective filter elements include, are smaller than the corresponding angles between the filter disks of the filter elements which are arranged on the first circular ring.

At the ends opposite to the lower transverse carrier, the carrier tubes 608*u* of the filter disks are connected to a common annular tube through consoles.

The interior of the annular tube 648 is connected at least through a connection tube 660 in the area of the attachment location of the lower transverse carrier 611 to the interior of the hollow shaft 601, said transverse carrier having at its upper end an outlet 614 at a rotary coupling.

The lower transverse carrier 611 is also provided with turbine blades, which upon rotation of the lower transverse carrier 611 cause an axial upwardly direction flow in the pulp into which the filter unit is submerged, cf. FIG. 36, bottom. The hollow shaft 601 has a drive of its own, sets it in a rotation opposite to the rotation of the upper transverse carrier.

At this point it must be emphasized that the filter elements can also be designed according to FIGS. 27 and 28, which is schematically indicated in FIG. 35 left of the hollow shaft. In this embodiment, the distance between the filter elements can also be chosen according to FIGS. 25 to 29.

During operation, which shall be explained by means of FIG. 36, flows are caused by the turbines in the pulp to be filtered, said flows being directed in the center of the filter unit centrally from the top to the bottom and from the bottom to the top. These flows meet one another in the center of the longitudinal extension of the hollow shaft and therefore deflect towards the outside, wherein they radially outwardly run through the filter elements. A flow superimposes on this flow which is caused by the rotation of the filter elements. This, however, does not substantially set the pulp in rotation so that it follows the rotation of the filter elements. Rather, such an annular flow in the direction of rotation of the hollow shaft is braked by the fact that the filter elements moving on concentric circles rotate in opposite directions.

The flow generate cause dynamic pressures at the filter media, which lead to the effect that the filtrate enters the filter elements. Since on their path of rotation, the filter elements of the different filter element groups cyclically approach one another and part from one another, pulsations occur in the flow so that a deposition of solid matter at the positions of the filter media loaded by the dynamic pressure is prevented.

As shown in FIG. 36, gas, in particular compressed air can be introduced into the pulp during the filtering process, in order to progress the filtering process. In FIG. 36 this is shown by two compressed-air outlet openings 650.

The pulp concentrated by the filter device according to FIGS. 35 and 36 can then be further processed in a pressing dryer. In other words, the apparatus according to FIGS. 35 and 36 is combined to form an apparatus comparable to FIG. 1, but further processing possibilities of the concentrated pulp are also conceivable.

What is claimed is:

1. A filtering device, comprising a vessel with at least two filter element groups arranged therein concentrically inside each other around a common axis of rotation, said filter element groups including filter elements arranged in parallel to the axis of rotation, which are held by carrying structures attached at hollow shafts arranged in the axis of rotation, drainage channels from the filter elements extending through said hollow shafts, wherein each filter element group includes a plurality of subgroups each being formed by at least two filter elements, wherein each filter element includes a carrying tube and a plurality of stacked filter disks attached thereon at mutual distance and drained through said carrying tube, the carrying tubes of the filter elements of a filter element subgroup being commonly attached on consoles which in turn are mounted on the carrying structure, wherein a drainage channel extends from the interior of each filter element through the carrying structure into the hollow shaft which outside of the vessel is connected to a filter outlet, each said hollow shaft being connected to an individual driving means for rotating said hollow shafts in opposite directions during the filtering operation.

2. A filter device as claimed in claim 1, wherein the filter disks are all parallel to one another.

3. A filter device as claimed in claim 1, wherein the filter disks have longitudinally of the carrying tube an alternating positive and negative inclination against a vertical towards a tube axis, wherein two filter disks adjoining a filter disk at both sides are parallel to one another.

4. A filter device as claimed in claim 3, wherein the angle enclosed between two filter disks is smaller at radially more outwardly arranged filter elements than at radially more inwardly arranged filter elements.

5. A filter device as claimed in claim 1, wherein the filter elements of a subgroup adjoin each other so closely that the filter disks of different filter elements of a subgroup radially overlap one another by keeping a mutual axial spacing.

6. A filter device as claimed in claim 1, wherein the head consoles of all subgroups are attached at an annular tube and at least one connection tube exists which connects the interior of the annular tube with the interior of the hollow shaft to establish a fluid connection from the interior of each filter plug to the hollow shaft.

7. A filter device as claimed in claim 6, wherein the carrying structure is at least partially hollow and is in fluid communication with the hollow head console and the hollow shaft.

8. A filter device as claimed in claim 6, wherein the annular tube is connected to the carrying structure by means of at least one pipeline.

9. A method of filtering solids from a pulp, said method comprising: providing a filtering device, comprising a vessel with at least two filter element groups arranged therein concentrically inside each other around a common axis of rotation, said filter element groups including filter elements arranged in parallel to the axis of rotation, which are held by carrying structures attached at hollow shafts arranged in the axis of rotation, drainage channels from the filter elements extending through said hollow shafts, wherein each filter element group includes a plurality of subgroups each being formed by at least two filter elements, wherein each filter element includes a carrying tube and a plurality of stacked filter disks attached thereon at mutual distance and drained through said carrying tube, the carrying tubes of the filter elements of a filter element subgroup being commonly attached on consoles which in turn are mounted on the carrying structure, wherein a drainage channel extends from the interior of each filter element through the carrying structure into the hollow shaft which outside of the vessel is connected to a filter outlet, each said hollow shaft being connected to an individual driving means, continuously feeding said pulp into said vessel and operating said driving means during a continued filtering process in a manner to rotate said hollow shafts in opposite directions.

* * * * *